United States Patent
Medvedev et al.

(10) Patent No.: US 7,020,482 B2
(45) Date of Patent: Mar. 28, 2006

(54) REALLOCATION OF EXCESS POWER FOR FULL CHANNEL-STATE INFORMATION (CSI) MULTIPLE-INPUT, MULTIPLE-OUTPUT (MIMO) SYSTEMS

(75) Inventors: Irina Medvedev, Somerville, MA (US); Jay Rod Walton, Westford, MA (US); John W. Ketchum, Harvard, MA (US)

(73) Assignee: Qualcomm Incorporated, San Diego, CA (US)

( * ) Notice: Subject to any disclaimer, the term of this patent is extended or adjusted under 35 U.S.C. 154(b) by 517 days.

(21) Appl. No.: 10/056,275

(22) Filed: Jan. 23, 2002

(65) Prior Publication Data

US 2003/0139196 A1 Jul. 24, 2003

(51) Int. Cl.
*H04B 7/00* (2006.01)

(52) U.S. Cl. .............................. 455/522; 69/455; 69/69

(58) Field of Classification Search ................ 455/522, 455/127.1, 127.2, 103, 69, 450, 452.1, 452.2, 455/453

See application file for complete search history.

(56) References Cited

U.S. PATENT DOCUMENTS

| | | | | |
|---|---|---|---|---|
| 5,832,387 A * | 11/1998 | Bae et al. | ................... | 455/522 |
| 6,226,281 B1 | 5/2001 | Cordier et al. | | |
| 6,334,058 B1 * | 12/2001 | Nystrom et al. | ............ | 455/453 |
| 6,442,214 B1 * | 8/2002 | Boleskei et al. | ............ | 375/299 |
| 2003/0139194 A1 * | 7/2003 | Onggosanusi et al. | ...... | 455/506 |

FOREIGN PATENT DOCUMENTS

| | | |
|---|---|---|
| EP | 0805568 A1 | 11/1997 |
| EP | 0926843 A2 | 6/1999 |
| EP | 1158716 A2 | 11/2001 |

* cited by examiner

*Primary Examiner*—Nay Maung
*Assistant Examiner*—Angelica M. Perez
(74) *Attorney, Agent, or Firm*—Dmitry Milikovsky; Sandip (Micky) Minhas; Philip Wadsworth

(57) ABSTRACT

Techniques to allocate the total transmit power to the transmission channels in a multi-channel communication system such that higher overall system spectral efficiency and/or other benefits may be achieved. The total transmit power may be initially allocated to the transmission channels based on a particular power allocation scheme (e.g., the water-filling scheme). The initial allocation may result in more power being allocated to some transmission channels than needed to achieve the required SNR (e.g., the SNR needed to achieve the maximum allowed data rate), which would then result in these transmission channels being operated in the saturation region. In such situations, the techniques reallocate the excess transmit power of transmission channels operated in the saturation region to other transmission channels operated below the saturation region. In this way, higher data rate may be achieved for the "poorer" transmission channels without sacrificing the performance of the "better" transmission channels.

41 Claims, 9 Drawing Sheets

REALLOCATION OF EXCESS POWER FOR FULL CHANNEL-STATE INFORMATION (CSI) MULTIPLE-INPUT, MULTIPLE-OUTPUT (MIMO) SYSTEMS

BACKGROUND

1. Field

The present invention relates generally to data communication, and more specifically to techniques for reallocating excess power in a multi-channel communication system (e.g., a multiple-input, multiple-output (MIMO) communication system).

2. Background

In a wireless communication system, an RF modulated signal from a transmitter may reach a receiver via a number of propagation paths. The characteristics of the propagation paths typically vary over time due to a number of factors such as fading and multipath. To provide diversity against deleterious path effects and improve performance, multiple transmit and receive antennas may be used. If the propagation paths between the transmit and receive antennas are linearly independent (i.e., a transmission on one path is not formed as a linear combination of the transmissions on other paths), which is generally true to at least an extent, then the likelihood of correctly receiving a data transmission increases as the number of antennas increases. Generally, diversity increases and performance improves as the number of transmit and receive antennas increases.

A multiple-input, multiple-output (MIMO) communication system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, with $N_S \leq \min \{N_T, N_R\}$. Each of the Ns independent channels is also referred to as a spatial subchannel of the MIMO channel and corresponds to a dimension. The MIMO system can provide improved performance (e.g., increased transmission capacity) if the additional dimensionalities created by the multiple transmit and receive antennas are utilized. For example, an independent data stream may be transmitted oh each of the Ns spatial subchannels to increase system throughput.

The spatial subchannels of a wideband MIMO system may experience different channel conditions (e.g., different fading and multipath effects) and may achieve different signal-to-noise ratios (SNRs) for a given amount of transmit power. Consequently, the data rates that may be supported by the spatial subchannels may be different from subchannel to subchannel. Moreover, the channel conditions typically vary with time. As a result, the data rates supported by the spatial subchannels also vary with time.

A key challenge in a coded communication system is the selection of the appropriate data rates, coding and modulation schemes, and transmit powers to be used for data transmission on the available transmission channels based on the channel conditions. The goal of this selection process should be to maximize spectral efficiency while meeting quality objectives, which may be quantified by a particular target frame error rate (FER) and/or some other criteria.

In a typical communication system, there may be an upper limit on the data rate that may be used for any given data stream. For example, a set of discrete data rates may be supported by the system, and the maximum data rate from among these discrete data rates may be considered as the saturation spectral efficiency, $\rho_{sat}$, for any given data stream. In such a system, if each data stream is transmitted on a respective spatial subchannel, then allocating more transmit power than necessary to achieve the target FER at the maximum data rate would result in an ineffective use of the additional transmit power. Even though the excess transmit power may result in a lower FER, this improvement in FER may not be considered substantial since the target FER has already been achieved. The excess transmit power may be more effectively used to increase spectral efficiency on some other spatial subchannels.

There is therefore a need in the art for techniques to allocate/reallocate transmit power among the spatial subchannels in a MIMO system if the saturation spectral efficiency has been reached by at least one of the subchannels.

SUMMARY

Aspects of the invention provide techniques to allocate the total transmit power to the transmission channels in a multi-channel communication system such that higher overall system throughput and/or other benefits may be achieved. The transmission channels may correspond to the spatial subchannels of a MIMO system, the frequency subchannels of an OFDM system, or the spatial subchannels of the frequency subchannels in a MIMO-OFDM system.

The total transmit power may be initially allocated to the transmission channels based on a particular power allocation scheme (e.g., the water-filling scheme). The initial allocation may result in more power being allocated to some transmission channels than needed to achieve the required signal-to-noise ratio (SNR) (e.g., the SNR needed to achieve the maximum allowed data rate), which would then result in these transmission channels being operated in the saturation region. In such situations, the techniques described herein advantageously reallocate the excess transmit power of transmission channels operated in the saturation region to other transmission channels operated below the saturation region. In this way, higher spectral efficiency may be achieved for the "poorer" transmission channels without sacrificing the performance of the "better" transmission channels.

In a specific embodiment, a method is provided for allocating transmit power to a number of transmission channels in a multi-channel communication system. Initially, a set of one or more transmission channels to be allocated transmit power is defined. The total transmit power available to allocate to the transmission channels in the set is determined and then allocated to these transmission channels based on a particular allocation scheme (e.g., the water-filling scheme). Transmission channels operated in the saturation region as a result of the allocated transmit powers are then identified. Each such transmission channel is allocated a revised amount of transmit power (e.g., the minimum amount needed to achieved the required SNR). The total excess transmit power of all transmission channels reallocated with revised transmit powers is then determined.

The above steps may be performed one or more times. The set of transmission channels for the first iteration includes all transmission channels to be allocated transmit power and, for each subsequent iteration, includes only the transmission channels not in the saturation region. Also, the total transmit power available for each subsequent iteration includes the total excess transmit power determined in the current iteration.

Various aspects and embodiments of the invention are described in further detail below. The invention further provides methods, processors, transmitter units, receiver units, base stations, terminals, systems, and other apparatuses and elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
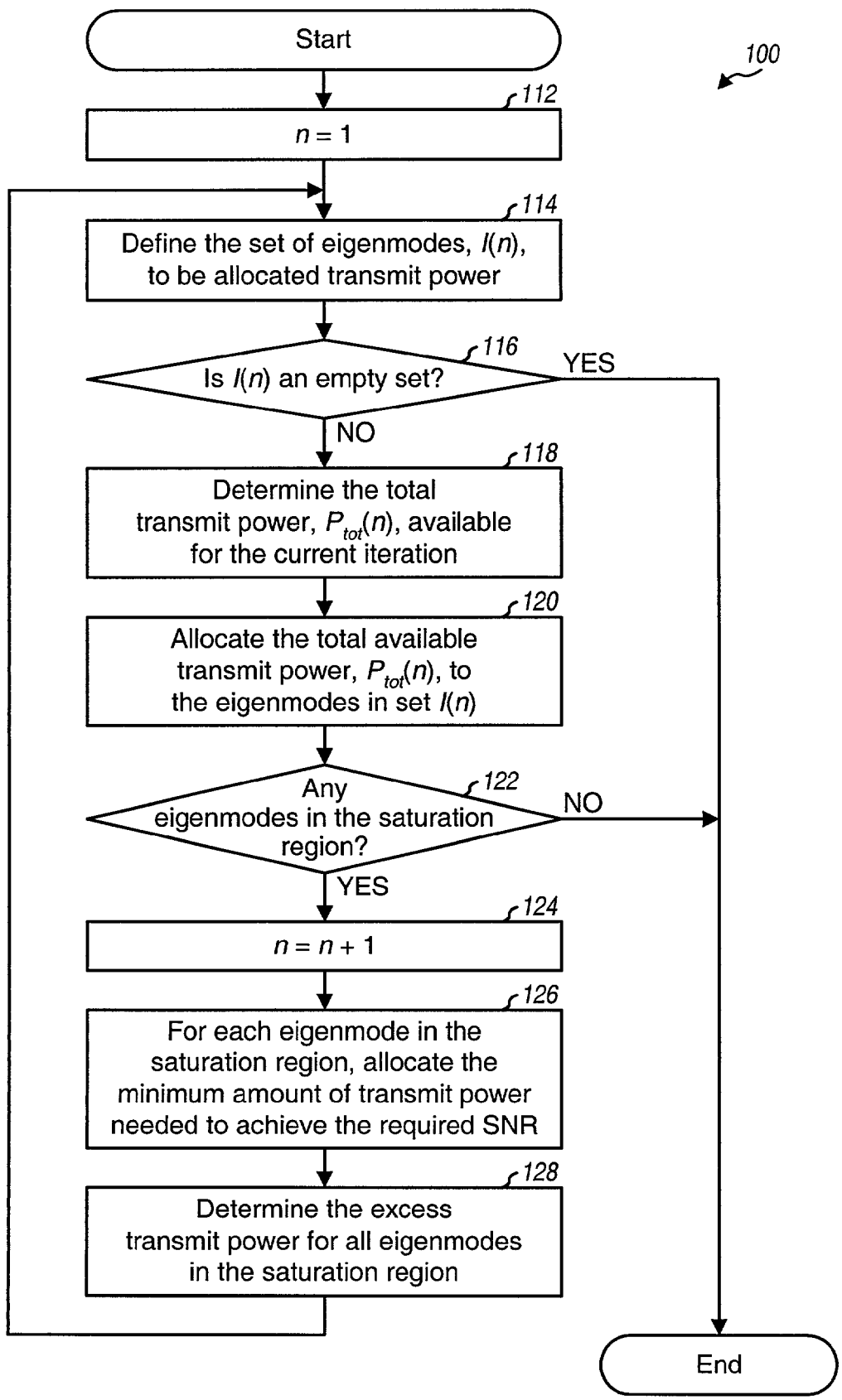
FIG. 1 is a flow diagram of an embodiment of a process for allocating the total transmit power among the eigenmodes in a MIMO system using power reallocation.

The techniques described herein for allocating/reallocating transmit power to transmission channels may be used for various multi-channel communication systems. Such multi-channel communication systems include multiple-input, multiple-output (MIMO) communication systems, orthogonal frequency division multiplexing (OFDM) communication systems, MIMO systems that utilize OFDM (i.e., MIMO-OFDM systems), and others. The multi-channel communication systems may also implement code division multiple access (CDMA), time division multiple access (TDMA), frequency division multiple access (FDMA), or some other multiple access techniques. Multiple access communication systems can support concurrent communication with a number of terminals (i.e., users). For clarity, certain aspects and embodiments of the invention are described specifically for a MIMO system such as a multiple-antenna wireless communication system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, with $N_S \leq \min\{N_T, N_R\}$. Each of the $N_S$ independent channels is also referred to as a spatial subchannel (or a transmission channel) of the MIMO channel. The number of spatial subchannels is determined by the number of eigenmodes for the MIMO channel, which in turn is dependent on a channel response matrix, H, that describes the response between the $N_T$ transmit and $N_R$ receive antennas.

The elements of the channel response matrix, H, are composed of independent Gaussian random variables, as follows:

$$H = \begin{bmatrix} h_{1,1} & h_{1,2} & \cdots & h_{1,N_T} \\ h_{2,1} & h_{2,2} & \cdots & h_{2,N_T} \\ \vdots & \vdots & & \vdots \\ h_{N_R,1} & h_{N_R,2} & \cdots & h_{N_R,N_T} \end{bmatrix}, \quad \text{Eq (1)}$$

where $h_{i,j}$ is the coupling (i.e., the complex gain) between the j-th transmit antenna and the i-th receive antenna. The model for the MIMO system may be expressed as:

$$y = Hx + n, \quad \text{Eq (2)}$$

where y is the received vector, i.e., $y = [y_1 y_2 \ldots y_{N_R}]^T$, where $\{y_i\}$ is the entry received on the i-th received antenna and $i \in \{1, \ldots, N_R\}$;

x is the transmitted vector, i.e., $x = [x_1 \ x_2 \ldots x_{N_T}]^T$, where $\{x_j\}$ is the entry transmitted from the j-th transmit antenna and $j \in \{1, \ldots, N_T\}$;

H is the channel response matrix for the MIMO channel;

n is the additive white Gaussian noise (AWGN) with a mean vector of 0 and a covariance matrix of $\Lambda_n = \sigma^2 I$, where 0 is a vector of zeros, I is the identity matrix with ones along the diagonal and zeros everywhere else, and $\sigma^2$ is the variance of the noise; and $[.]^T$ denotes the transpose of $[.]$.

For simplicity, the MIMO channel is assumed to be a flat-fading, narrowband channel. In this case, the elements of the channel response matrix, H, are scalars, and the coupling, $h_{i,j}$, between each transmit-receive antenna pair can be represented by a single scalar value. However, the power allocation/reallocation techniques described herein may also be applied to a frequency selective channel having different channel gains at different frequencies. In such a frequency selective channel, the operating bandwidth may be divided into a number of (equal or unequal) frequency bands such that each band may be considered as a flat-fading channel. The response of the individual bands may then be considered in the allocation/reallocation of the total transmit power.

Due to scattering in the propagation environment, $N_T$ data streams transmitted from the $N_T$ transmit antennas interfere with each other at the receiver. One technique for eliminating or reducing this interference is to "diagonalize" the MIMO channel such that these data streams are effectively transmitted on orthogonal spatial subchannels. One technique for diagonalizing the MIMO channel is to perform singular value decomposition on the channel response matrix, H, which can be expressed as:

$$H = UDV^H, \quad \text{Eq (3)}$$

where U is an $N_R \times N_R$ unitary matrix (i.e., $U^H U = I$);

D is an $N_R \times N_T$ matrix;

V is an $N_T \times N_T$ unitary matrix; and

"$^H$" denotes the complex transpose of a matrix.

The diagonal entries of matrix D are the square roots of the eigenvalues of $G = H^H H$, denoted by $\lambda_i$ and $i \in \{1, \ldots, N_S\}$, where $N_S \leq \min\{N_T, N_R\}$ is the number of resolvable data streams. All non-diagonal entries of D are zero.

The diagonal matrix D thus contains non-negative real values along the diagonal and zeros elsewhere, where the non-negative real values are $d_i=\sqrt{\lambda_i}$. The $d_i$ are referred to as the singular values of the channel response matrix, H. The singular value decomposition is a matrix operation known in the art and described in various references. One such reference is a book by Gilbert Strang entitled "Linear Algebra and Its Applications," Second Edition, Academic Press, 1980, which is incorporated herein by reference.

The singular value decomposition decomposes the channel response matrix, H, into two unitary matrices, U and V, and the diagonal matrix, D. Matrix D is descriptive of the eigenmodes of the MIMO channel, which correspond to the spatial subchannels. The unitary matrices, U and V, include "steering" vectors for the receiver and transmitter, respectively, which may be used to diagonalize the MIMO channel. Specifically, to diagonalize the MIMO channel, a signal vector, s, may be pre-multiplied with the matrix, V, and the resultant vector, x=Vs, is transmitted over the MIMO channel. At the receiver, the received vector, y=Hx+n, may be pre-multiplied with the matrix, $U^H$, to obtain a recovered vector, r, as follows:

$$\underline{r} = \underline{U}^H\underline{H}\underline{V}\underline{s} + \underline{U}^H\underline{n} \qquad \text{Eq (4)}$$
$$= \underline{D}\underline{s} + \hat{\underline{n}},$$

where $\hat{n}$ is simply a rotation of n, resulting in additive white Gaussian noise with the same mean vector and covariance matrix as n.

As shown in equation (4), the pre-multiplication of the signal vector, s, by the matrix V and the pre-multiplication of the received vector, y, by the matrix $U^H$ results in an effective diagonal channel, D, which is the transfer function between the signal vector, s, and the recovered vector, r. As a result, the MIMO channel is decomposed into $N_S$ independent, non-interfering, orthogonal, and parallel channels. These independent channels are also referred to as the spatial subchannels of the MIMO channel. Spatial subchannel i or eigenmode i has a gain that is equal to the eigenvalue, $\lambda_i$, where $i \in I$ and set I is defined as $I=\{1, \ldots, N_S\}$. Diagonalization of the MIMO channel to obtain $N_S$ orthogonal spatial subchannels can be achieved if the transmitter is provided with an estimate of the channel response matrix, H.

In a typical MIMO system, a peak transmit power of $P_{max}$ may be imposed on each of the $N_T$ transmit antennas. In this case, the total transmit power, $P_{tot}$, available at the transmitter for all $N_T$ transmit antennas may be expressed as:

$$P_{tot}N_T P_{max}. \qquad \text{Eq (5)}$$

The total transmit power, $P_{tot}$, may be allocated to the $N_S$ non-zero eigenmodes (i.e., the spatial subchannels) based on various schemes. If the objective is to maximize capacity (i.e., spectral efficiency), then the total transmit power, $P_{tot}$, may be allocated to the spatial subchannels by a "water-filling" scheme.

The water-filling scheme is analogous to pouring a fixed amount of water into a vessel with an irregular bottom, where each eigenmode corresponds to a point on the bottom of the vessel, and the elevation of the bottom at any given point corresponds to the inverse of the signal-to-noise ratio (SNR) associated with that eigenmode. A low elevation thus corresponds to a high SNR and, conversely, a high elevation corresponds to a low SNR. The total transmit power, $P_{tot}$, is then "poured" into the vessel such that the lower points in the vessel (i.e., higher SNRs) are filled first, and the higher points (i.e., lower SNRs) are filled later. The power distribution is dependent on the total transmit power, $P_{tot}$, and the depth of the vessel over the bottom surface. The water surface level for the vessel after all of the total transmit power has been poured is constant over all points in the vessel. The points with elevations above the water surface level are not filled (i.e., eigenmodes with SNRs below a particular threshold are not used). The water-filling distribution is described by Robert G. Gallager, in "Information Theory and Reliable Communication," John Wiley and Sons, 1968, which is incorporated herein by reference.

Capacity is defined as the highest spectral efficiency at which information can be communicated with an arbitrarily low probability of error, and is typically given in unit of bits per second per Hertz (bps/Hz). The capacity for one Gaussian channel with an SNR of γ may be expressed as:

$$C=\log_2(1+\gamma). \qquad \text{Eq (6)}$$

For a MIMO system with limited total transmit power of $P_{tot}$, the water-filling scheme can optimally allocate the total transmit power to the Ns spatial subchannels such that capacity is achieved. The water-filling scheme distributes the total transmit power, $P_{tot}$, over the eigenmodes in such a way that the eigenmode with the lowest noise variance (i.e., the highest SNR) receives the greatest fraction of the total power. The amount of power allocated to eigenmode i as a result of water filling is denoted by $P_i$, for $i \in I$, where $$P_{tot} = \sum_{i \in I} P_i. \qquad \text{Eq (7)}$$

Based on the allocated transmit power of $P_i$ for eigenmode i, for $i \in I$, the effective SNR for eigenmode i, $\gamma_i$, may be expressed as:

$$\gamma_i = \frac{P_i \cdot \lambda_i}{\sigma^2}, \qquad \text{Eq (8)}$$

where $\lambda_i$ is the eigenvalue for eigenmode i and $\sigma^2$ is the noise variance for the MIMO channel. The capacity for the $N_S$ spatial subchannels may then be expressed as:

$$C = \sum_{i=1}^{N_S} \log_2(1+\gamma_i). \qquad \text{Eq (9)}$$

The spectral efficiency of each eigenmode may be determined based on a particular monotonically increasing function in SNR. One function that may be used for spectral efficiency is the capacity function shown in equation (6). In this case, the spectral efficiency for eigenmode i, 92 $_i$, may be expressed as:

$$\rho_i, =\log_2(1+\gamma_i) \qquad \text{Eq (10)}$$

Figure 4A:
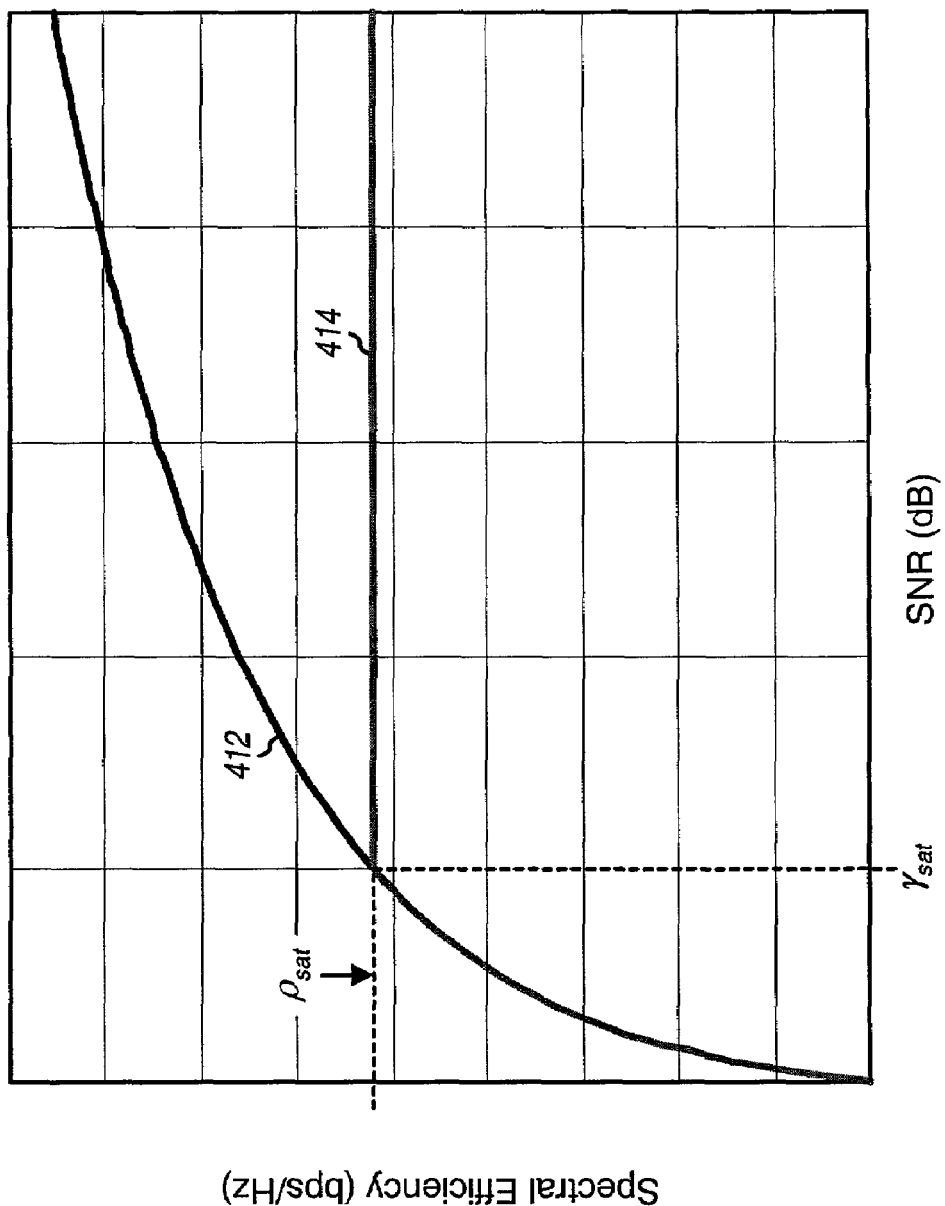
FIG. 4A shows two plots for spectral efficiency versus effective SNR.

FIG. 4A shows two plots for spectral efficiency versus SNR. Plot 412 shows spectral efficiency increasing logarithmically with SNR as computed based on equation (10). Equation (10) assumes that an increase in SNR results in increasingly higher spectral efficiency. However, in a practical communication system, there may be an upper limit on spectral efficiency, which may be dictated, for example, by the maximum data rate supported by the system on any given data stream. Plot 414 shows spectral efficiency increasing logarithmically at lower SNRs and saturating at $\rho_{sat}$, which is the upper limit on spectral efficiency. Saturation occurs when an increase in SNR no longer produces an increase in spectral efficiency. The SNR at which spectral efficiency saturates is denoted as $\gamma_{sat}$ (i.e., $\gamma_{sat} \Leftrightarrow \rho_{sat}$).

Depending on the total transmit power, $P_{tot}$, the eigenvalues, $\lambda_i$, and the noise variance, $\sigma^2$, the allocation of the total transmit power by the water-filling scheme may result in some eigenmodes being operated in the saturation region (i.e., $\gamma_i > \gamma_{sat}$) and the remaining eigenmodes being operated below this region (i.e., $\gamma_i \leq \gamma_{sat}$). An eigenmode is deemed as being operated in the saturation region if it is allocated more transmit power than necessary to achieve the required SNR, which is $\gamma_{sat}$ if the objective is to achieve the maximum possible spectral efficiency, $\rho_{sat}$. Although the excess transmit power increases the effective SNR for the eigenmode, which may then lower the frame error rate (FER), this type of improvement in performance is typically not substantial since the system may already be operating at the target FER or at very low FERs. In this case, the excess transmit power that brings the effective SNR beyond the required SNR is not utilized effectively. Improved system performance may be achieved by utilizing the excess transmit power to increase the overall system spectral efficiency.

Similarly, in a power-controlled MIMO system, there may be an upper limit on the SNR allowed at the receiver (i.e., the effective SNR mentioned above) for each eigenmode, which may also be represented as $\gamma_{sat}$. In this case, if the transmit power allocated to a given eigenmode results in an effective SNR greater than $\gamma_{sat}$, then the excess transmit power that increases the SNR beyond $\gamma_{sat}$ cannot be used on that eigenmode because of the imposed upper limit on SNR. This excess transmit power may be more beneficially distributed among the other eigenmodes operating below $\gamma_{sat}$.

An aspect of the invention provides techniques to allocate/reallocate the total transmit power to the eigenmodes such that higher overall system spectral efficiency and/or other benefits may be achieved. The total transmit power may be initially allocated to the eigenmodes based on a particular power allocation scheme. The initial allocation may result in more power being allocated to some eigenmodes than needed to achieve the required SNR (e.g., the $\gamma_{sat}$ needed to support the saturation spectral efficiency, $\rho_{sat}$), which would then result in these eigenmodes being operated in the saturation region. In such situations, the techniques described herein advantageously reallocate the excess transmit power of eigenmodes operated in the saturation region to other eigenmodes operated below the saturation region. In this way, higher spectral efficiency may be achieved for the "poorer" eigenmodes without sacrificing the performance of the "better" eigenmodes.

FIG. 1 is a flow diagram of an embodiment of a process 100 for allocating the total transmit power among the eigenmodes in the MIMO system. This process initially allocates the total transmit power, $P_{tot}$, to the $N_S$ eigenmodes based on a particular power allocation scheme (e.g., the water-filling scheme). If any of the eigenmodes is allocated more transmit power then needed to achieve the required SNR (i.e., operated in the saturation region), then the total excess transmit power for these eigenmodes is determined and reallocated to the other eigenmodes. Since the reallocation of the total excess transmit power may result in some other eigenmodes being operated in the saturation region, the process may be performed (or iterated) one or more times until either (1) no excess transmit power is available for reallocation, or (2) all eigenmodes are in the saturation region.

Initially, the variable n used to denote the iteration number is initialized to one (i.e., n=1) for the first iteration, at step 112. The set of all eigenmodes, I(n), to be allocated transmit power for this iteration is then defined, at step 114. For the first iteration, all $N_S$ eigenmodes are considered in the allocation of the total transmit power, and I(n)={1, . . . , $N_S$}. And for each subsequent iteration, only the eigenmodes operated below the saturation region are considered in the allocation of the total remaining transmit power, and set I(n) would include less than Ns eigenmodes or may even be an empty set.

If set I(n) is empty, as determined at step 116, indicating that there are no eigenmodes operated below the saturation region to which more transmit power may be allocated, then the process terminates. Otherwise, if set I(n) is not empty, then the total transmit power, $P_{tot}(n)$, available for allocation for this iteration is determined, at step 118. For the first iteration, the total transmit power, $P_{tot}(n)$, available for all $N_T$ transmit antennas may be determined as shown in equation (5). This assumes that each transmit antenna will be operated at the peak transmit power, $P_{max}$. And for each subsequent iteration, the total transmit power, $P_{tot}(n)$, available for that iteration may be determined as described below.

The total available transmit power, $P_{tot}(n)$, is then allocated to the eigenmodes in set I(n) based on the selected power allocation scheme, at step 120. Various schemes may be used for power allocation such as, for example, the water-filling scheme, a uniform allocation scheme that allocates equal amount of transmit power to all eigenmodes, and possibly other schemes. The transmit power may also be allocated based on schemes that may take into consideration other factors such as, for example, fairness, one or more system and/or terminal metrics, and so on.

In an embodiment, the water-filling scheme is used to distribute the total available transmit power, $P_{tot}(n)$, to the eigenmodes in set I(n). The result of the water-filling procedure is a specific transmit power, $P_i(n)$, allocated to each eigenmode in set I(n), for $i \in I(n)$. The power allocation is dependent on the total available transmit power, $P_{tot}(n)$, and the eigenvalues, $\lambda_i$, for the eigenmodes in set I(n). The effective SNR of each eigenmode in set I(n) may then be determined as:

$$\gamma_i(n) = \frac{P_i(n) \cdot \lambda_i}{\sigma^2}, \text{ for } i \in I(n). \qquad \text{Eq (11)}$$

A determination is then made whether or not any of the eigenmodes in set I(n) are operated in the saturation region given their allocated transmit powers, at step 122. This may be achieved by comparing the effective SNR, $\gamma_i(n)$, determined for each eigenmode, to the saturation SNR, $\gamma_{sat}$. Each eigenmode in I(n) having $\gamma_i(n)$ greater than $\gamma_{sat}$ is deemed as being operated in the saturation region and placed in a temporary set J, such that $\gamma_j(n) > \gamma_{sat}$ for $j \in J$. If none of the eigenmodes in set I(n) are in the saturation region, which is indicated by an empty set J, then there is no excess transmit power to reallocate, and the process terminates. Otherwise, if set J includes at least one eigenmode, then the excess transmit power for all eigenmodes in set J is determined and reallocated to other eigenmodes not in the saturation region, if there are any.

The next iteration to reallocate the excess transmit power begins by incrementing the variable n by one (i.e., n=n+1), at step 124. Each eigenmode in the saturation region, which is included in set J, is then allocated the minimum amount of transmit power needed to achieve the required SNR (e.g., $\gamma_{sat}$), at step 126. This transmit power can be determined as:

$$P_j(n) = \frac{\gamma_{sat} \cdot \sigma^2}{\lambda_j}, \text{ for } j \in J. \qquad \text{Eq (12)}$$

The transmit power saved by allocating each eigenmode in set J with the minimum power to achieve its required SNR is then determined, at step 128. The total excess transmit power may then be determined as:

$$\Delta P(n) = \sum_{j \in J} (P_j(n-1) - P_j(n)). \qquad \text{Eq (13)}$$

This total excess transmit power, $\Delta P(n)$, may now be reallocated to the eigenmodes that are still operated below the saturation region. The process then returns to step 114.

For the second iteration, the set of eigenmodes, I(n), to be allocated transmit power in this iteration is defined, at step 114. Set I(n) may be defined by removing the eigenmodes in set J (i.e., the eigenmodes that were in the saturation region) from set I(n−1) defined for the previous iteration. Set I(n) for the current iteration thus only includes eigenmodes that are currently not in saturation. If the new set I(n) is empty, as determined at step 116, then all eigenmodes are operated in the saturation region and no further reallocation of transmit power is needed, and the process terminates. Otherwise, if the new set I(n) is not empty, then the total transmit power, $P_{tot}(n)$, available for the current iteration may be determined as:

$$P_{tot}(n) = \sum_{i \in I(n)} P_i(n) + \Delta P(n). \qquad \text{Eq (14)}$$

The total transmit power, $P_{tot}(n)$, available for the current iteration is then allocated to the eigenmodes in the new set I(n) based on the selected power allocation scheme, at step 120.

The process shown in FIG. 1 proceeds until either (1) all of the excess transmit power has been reallocated to the eigenmodes not in the saturation region (as determined in step 122, which may occur for low SNR operating environment), or (2) all eigenmodes are in the saturation region (as determined in step 116, which may occur for high SNR operating environment).

In the above description, it is assumed that spectral efficiency is a strictly increasing function of the effective SNR, as shown by equation (10). The transmit power allocation/reallocation techniques described herein may also be used if spectral efficiency is a non-linear function of the effective SNR. In such cases, the non-linearity may be taken into account when allocating/reallocating the available transmit power to the eigenmodes.

As noted above, the transmit power allocation/reallocation techniques described herein may also be used for power control in a wireless communication system. Each eigenmode may be associated with a particular setpoint, which is the target SNR needed to achieve the desired performance. The same or different setpoints may be used for the Ns eigenmodes. The total transmit power may then be allocated to the eigenmodes such that the setpoint(s) are achieved for these eigenmodes. The process shown in FIG. 1 may be used to reallocate transmit power to the eigenmodes, where the required SNR is now the setpoint instead of $\gamma_{sat}$. The determination of whether or not a particular eigenmode is operated in the saturation region may thus be dependent on the specific setpoint associated with that eigenmode (instead of a common SNR, such as $\gamma_{sat}$)

The transmit power allocation/reallocation techniques described herein may also be used for other multi-channel communication systems, such as OFDM systems, MIMO-OFDM systems, and so on.

An OFDM system effectively partitions the system bandwidth into a number of ($N_F$) frequency subchannels, which are also commonly referred to as frequency bins or subbands. Each frequency subchannel is associated with a respective subcarrier (or frequency tone) upon which data may be modulated. At each time slot, which is a particular time interval that may be dependent on the bandwidth of a frequency subchannel, a modulation symbol may be transmitted on each of the $N_F$ frequency subchannels. For the OFDM system, each frequency subchannel may be referred to as a transmission channel, and there are $N_C = N_F$ transmission channels for the OFDM system.

The frequency subchannels of the OFDM system may experience frequency selective fading (i.e., different amounts of attenuation for different frequency subchannels). The specific response for the frequency subchannels is dependent on the characteristics (e.g., the fading and multipath effects) of the propagation path between the transmit and receive antennas. Consequently, different effective SNRs may be achieved for different frequency subchannels for a given amount of transmit power. In this case, the total transmit power may be allocated to the $N_F$ frequency subchannels in similar manner as that described above for the eigenmodes.

A MIMO-OFDM system includes $N_F$ frequency subchannels for each of the Ns eigenmodes. Each frequency subchannel of each eigenmode may be referred to as a transmission channel, and there are $NC = N_F \cdot N_S$ transmission channels for the MIMO-OFDM system. The frequency subchannels of each eigenmode in the MIMO-OFDM system may similarly experience different channel conditions and may achieve different SNRs for a given amount of transmit power. In this case, the total transmit power may also be allocated to the $N_C$ transmission channels in similar manner as that described above for the eigenmodes.

Figure 2:
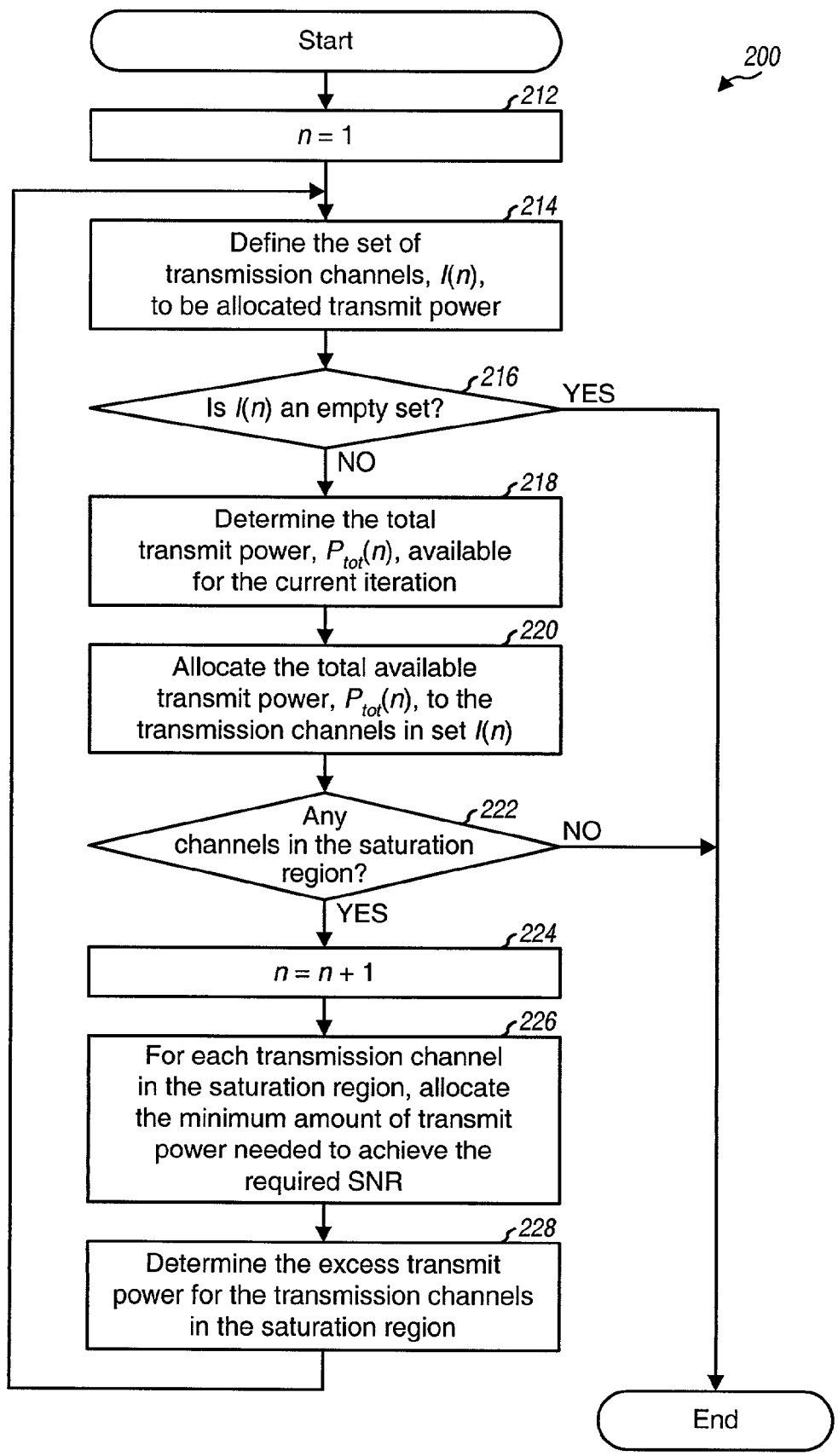
FIG. 2 is a flow diagram of an embodiment of a process for allocating the total transmit power among the transmission channels in a multi-channel communication system using power reallocation.

FIG. 2 is a flow diagram of an embodiment of a process 200 for allocating the total transmit power among $N_C$ transmission channels in a multi-channel communication system. Process 200 may be used for any multi-channel communication system, including a MIMO system, an OFDM system, a MIMO-OFDM system, and so on. Process 200 initially allocates the total transmit power, $P_{tot}$, to the $N_C$ transmission channels based on a particular power allocation scheme (e.g., the water-filling scheme). If any of the transmission channels are allocated more transmit power than needed to achieve the required SNR (i.e., operated in the saturation region), then the total excess transmit power for these transmission channels is determined and reallocated to the other transmission channels. Again, the transmit power allocation may be performed (or iterated) one or more times until either (1) no excess transmit power is available for reallocation, or (2) all transmission channels are in the saturation region.

Initially, the variable n used to denote the iteration number is initialized to one (i.e., n=1) for the first iteration, at step 212. The set of all transmission channels, I(n), to be allocated transmit power for this iteration is then defined, at step 214. For the first iteration, all $N_C$ transmission channels are considered in the allocation of the total transmit power, and I(n)={1, . . . , $N_C$}, where $N_C$=$N_S$ for a MIMO system, $N$=$N_F$ for an OFDM system, and $N_C$=$N_F \cdot N_S$ for a MIMO-OFDM system. And for each subsequent iteration, only transmission channels operated below the saturation region are considered in the allocation of the total remaining transmit power. Set I(n) would then include less than $N_C$ transmission channels or may even be an empty set.

If set I(n) is empty, as determined at step 216, indicating that there are no transmission channels operated below the saturation region to which more transmit power may be reallocated, then the process terminates. Otherwise, the total transmit power, $P_{tot}(n)$, available for allocation for this iteration is determined, at step 218. The total available transmit power, $P_{tot}(n)$, is then allocated to the transmission channels in set I(n) based on the selected power allocation scheme, at step 220.

A determination is then made whether or not any of the transmission channels in set I(n) are operated in the saturation region given their allocated transmit powers, at step 222. This may be achieved by comparing the effective SNR, $\gamma_i(n)$, determined for each transmission channel in set I(n) to the setpoint applicable to that transmission channel. Depending on the system design, one setpoint may be used for (1) all transmission channels, (2) each transmit antenna or each frequency subchannel, (3) each transmission channel, or (4) each group of transmission channels. Each transmission channel having an effective SNR greater than the applicable setpoint is deemed to be operated in the saturation region and placed in set J. If no transmission channels are in the saturation region, as indicated by an empty set J, then there is no excess transmit power to reallocate, and the process terminates. Otherwise, if set J includes at least one transmission channel, then the excess transmit power of all transmission channels in set J is determined and reallocated to other transmission channels, if any, that are not currently operated in the saturation region.

The next iteration to reallocate the excess transmit power begins by incrementing the variable n by one (i.e., n=n+1), at step 224. Each transmission channel in the saturation region is then allocated the minimum amount of transmit power needed to achieve the applicable setpoint, at step 226. The transmit power saved by allocating each transmission channel in set J with the minimum power to achieve its setpoint is then determined, at step 228. The total excess transmit power may now be reallocated to transmission channels that are still operated below the saturation region. The process then returns to step 214.

For the second iteration, the set of transmission channels, I(n), to be allocated transmit power in this iteration is defined to include only transmission channels that are currently not in saturation, at step 214. If the new set I(n) is empty, as determined at step 216, then all transmission channels are operated in the saturation region, no further reallocation of transmit power is needed, and the process terminates. Otherwise, if the new set I(n) is not empty, then the total transmit power, $P_{tot}(n)$, available for the current iteration is determined, at step 218, and then allocated to the transmission channels in the new set I(n) based on the selected power allocation scheme, at step 220.

The process shown in FIG. 2 proceeds until either (1) all of the excess transmit power has been reallocated to the transmission channels not in the saturation region (as determined in step 222), or (2) all transmission channels are in the saturation region (as determined in step 216).

For a MIMO-OFDM system, all transmission channels (i.e., for both the spatial and frequency dimensions) may be considered for power allocation in each iteration. Alternatively, the power allocation may be performed such that the transmission channels for only one dimension are considered at any given time. For example, power allocation may be performed on a per-transmit antenna basis whereby the total transmit power, $P_{max}$, for each transmit antenna is allocated to the frequency subchannels of that transmit antenna.

The techniques described herein may also be used to allocate/reallocate transmit power to groups of transmission channels. Each group may include any number of transmission channels and may be associated with a respective setpoint. Each group may include, for example, the transmission channels to be used for an independent data stream, which may be associated with a particular data rate and a particular coding and modulation scheme. For a multiple-access communication system, each group may be associated with the transmission channels to be assigned to a different receiver.

In the above description for the MIMO system, singular value decomposition is used to diagonalize the MIMO channel. In other embodiments, the receiver may provide an indication of the quality of each transmission channel that may be used for data transmission. The information reported by the receiver may be in the form of an estimated SNR, a supported data rate, and so on. The transmitter can then allocate transmit power to the transmission channels based on the reported information to achieve better utilization of the available transmit power. For example, if the estimated SNR for a given transmission channel is higher than needed to achieve a designated data rate, or if the data rate reported as being supported by a given transmission channel is greater than the system's maximum data rate, then less transmit power may be allocated for the transmission channel. The specific amount of transmit power to be allocated may be determined based on the reported information (e.g., the estimated SNR or supported data rate).

A specific numerical example is described below to illustrate the techniques for allocating/reallocating the total transmit power among eigenmodes. For this example, the peak transmit power for each transmit antenna is normalized so that $P_{max}=1$, and the variance of the noise is set so that the SNR at each receiver, assuming no other channel degradation, is $\gamma_{rx}=15$ dB. This then results in a noise variance of $\sigma^2=10^{-15/10}=0.0316$. The following parameters are also assumed:

$N_S=N_T=N_R=4$, $\lambda_1=2.4, \lambda_2=1.0, \lambda_3=0.4,$ and $\lambda_4=0.2,$ and $\gamma_{sat|dB}=15$ dB $\rightarrow \gamma_{sat}=31.62$.

At initialization (i.e., n=1 in FIG. 1), the set of eigenmodes to be allocated transmit power is defined to be I(1)={1, 2, 3, 4} (step 114) and the total transmit power is $P_{tot}(n)=4\cdot1=4$ (step 118). For the first iteration, the water-filling power allocation (step 120) results in the following powers being assigned to the eigenmodes in set I(1):

$P_1(1)=1.06, P_2(1)=1.04, P_3(1)=0.99,$ and $P_4(1)=0.91.$

The effective SNRs for the eigenmodes in set I(1), calculated using equation (11), are determined to be:

$\gamma_1(1)=80.25, \gamma_2(1)=32.85, \gamma_3(1)=12.54,$ and
$\gamma_4(1)=5.77.$ Since $\gamma_{sat}$=31.62, it can be observed that eigenmodes 1 and 2 are operated in the saturation region. Thus, the set of eigenmodes in the saturation region is defined as J={1, 2}.

Since set J is not empty (step 122), transmit power reallocation is performed. This is achieved by first incrementing the index n to n=2 (step 124). The eigenmodes in the saturation region are then allocated the minimum amount of transmit power to achieve $\lambda_{sat}$. The new transmit power allocation for eigenmodes 1 and 2 in set J can be determined using equation (12) (step 126), as follows:

$$P_1(2) = \frac{31.62 \times 0.0316}{2.4} = 0.42 \text{ and}$$

$$P_2(2) = \frac{31.62 \times 0.0316}{1.0} = 1.00.$$

The total excess transmit power for eigenmodes 1 and 2 is then determined using equation (13) (step 128), as follows:

$$\Delta P = (1.06-0.42)+(1.04-1.00)=0.68.$$

For the second iteration (n=2), the set of eigenmodes I(2) to be allocated transmit power is redefined (step 114) to include only those that are currently not in the saturation region, which is I(2)={3, 4}. The total transmit power available for this iteration is then determined using equation (14) (step 118), as follows:

$$P_{tot}(2)=0.99+0.91+0.68=2.58.$$

The total available transmit power, $P_{tot}(2)$, is then allocated to the eigenmodes in set I(2). For the second iteration, the water-filling power allocation (step 120) results in the following powers being assigned to the eigenmodes in set I(2):

$$P_3(2)=1.33 \text{ and } P_4(2)=1.25.$$

The effective SNRs for eigenmodes 3 and 4 are then determined to be:

$$\gamma_3(2)=16.84 \text{ and } \gamma_4(2)=7.92.$$

Since $\lambda_{sat}$=31.62, it can be observed that none of the eigenmodes are operated in the saturation region, and the transmit power allocation process terminates. The final transmit power allocation for eigenmodes 1 through 4 is as follows:

$$P_1=0.42, P_2=1.00, P_3=1.33, \text{ and } P_4=1.25,$$

and the effective SNRs are:

$$\gamma_1=31.62, \gamma_2=31.62, \gamma_3=16.84, \text{ and } \gamma_4=7.92.$$

After the total transmit power has been allocated to the eigenmodes, the spectral efficiency for each eigenmode in set I(1)={1, 2, 3, 4} can be determined using equation (10). The total spectral efficiency, $P_{tot}$, may then be obtained by summing the spectral efficiency achieved by each of the eigenmodes.

It can be shown that a gain of 2 to 5 dB may be achieved at intermediate SNRs by reallocating the excess transmit power of eigenmodes in the saturation region to other eigenmodes not in the saturation region. At low SNRs, the eigenmodes do not enter the saturation region, and there is little or no transmit power to reallocate. And at high SNRs, most or all of the eigenmodes may be operated in the saturation region, and the transmit power reallocation may be used to reduce the amount of interference, which may improve the performance of neighboring cells.

Power Allocation/Reallocation for Discrete Data Rates

In the above description, it is assumed that the spectral efficiency, ρ, is a continuous function of the effective SNR, γ, as shown in equation (10). Furthermore, the system described above allows the spectral efficiency to be any real value that does not exceed the saturation point, $\rho_{sat}$. A typical communication system, however, may only support a set of discrete data rates for each spatial subchannel, and the data rate sets may or may not be identical for the subchannels.

Figure 4B:
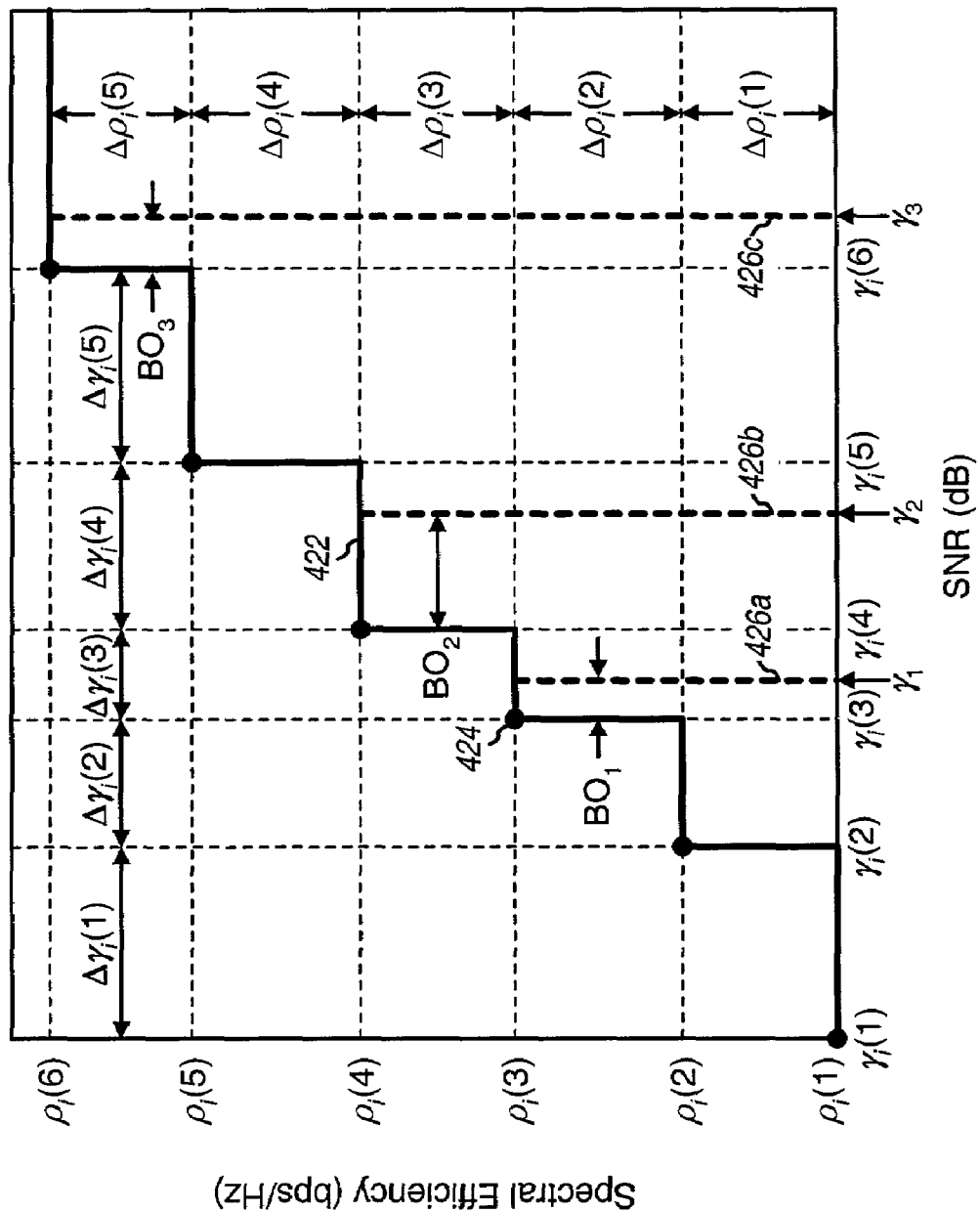
FIGS. 4B and 4C show plots of spectral efficiency versus effective SNR for a communication system that supports a set of discrete data rates.

FIG. 4B shows a plot of spectral efficiency versus effective SNR for a certain eigenmode in a communication system that supports a set of discrete data rates for each eigenmode. Each set of data rates may be converted to a set of discrete spectral efficiencies and is further associated with a set of discrete effective SNRs needed to achieve a target frame error rate (FER) for a data transmission on the spatial subchannel.

In FIG. 4B, the discrete spectral efficiencies are labeled as $\rho_i(d)$ on the vertical axis and occur at the corresponding SNRs of $\gamma_i(d)$, where i (i∈I) refers to eigenmode i and d ($1 \leq d \leq D_i$) is used to enumerate through the $D_i$ discrete data rates associated with eigenmode i. The highest spectral efficiency for eigenmode i occurs at d=$D_i$ and corresponds to the saturation spectral efficiency occurring at the saturation SNR, $\gamma_{sat}(i)=\gamma_i(D_i)$. The spectral efficiency function for this system is shown by plot 422 (the thick solid line). The discrete operating points at (($\gamma_i(d)$, $\rho_i(d)$)) corresponding to the minimum SNR necessary to achieve a certain spectral efficiency are shown by the solid circles 424. As seen from the spectral efficiency function in FIG. 4B, an increase in SNR may not offer an improvement in spectral efficiency. Therefore, allocating more transmit power than necessary to achieve the target FER at the operating spectral efficiency would result in an ineffective use of the additional transmit power.

The excess power allocation/reallocation techniques described above may be used for systems with discrete data rates and setpoints.

Figure 3:
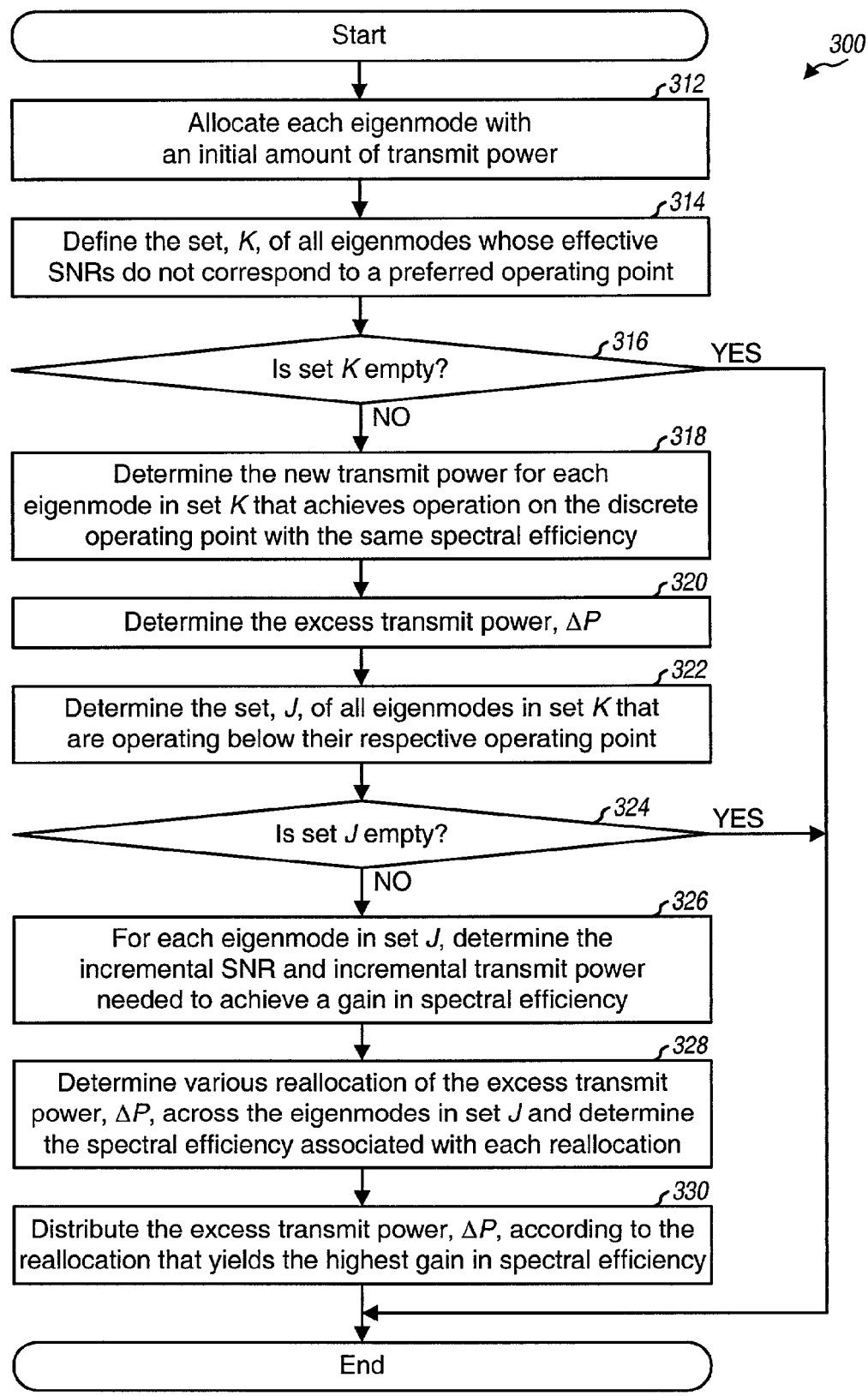
FIG. 3 is a flow diagram of an embodiment of a process for allocating the total transmit power among the eigenmodes in a MIMO system that supports a set of discrete data rates.

FIG. 3 is a flow diagram of an embodiment of a process 300 for allocating the total transmit power among the eigenmodes in a MIMO system that supports a set of discrete data rates. Initially, the total transmit power, $P_{tot}$, is allocated to the Ns eigenmodes based on a particular power allocation scheme (e.g., the water-filling scheme), at step 312. At the end of the initial transmit power allocation, each eigenmode is allocated transmit power of $P_i$, for i∈I, where the power allocated to a given eigenmode may be zero. If the effective SNR of an eigenmode does not fall on one of the discrete operating points, then some transmit power allocated to this eigenmode is used inefficiently and power control may be employed.

The eigenmodes whose effective SNRs do not fall on the set of discrete operating points are placed in set K, at step 314. If set K is empty, as determined in step 316, then the process terminates. Otherwise, each eigenmode in set K is allocated the minimum amount of transmit power necessary to meet the current spectral efficiency contribution of that eigenmode, at step 318. This is achieved by backing off (or reducing) the transmit power allocated to each eigenmode in K so that the eigenmode is now operating at the discrete operating point.

FIG. 4B also shows an example system whereby the initial operating points of the three eigenmodes, shown in by dashed lines 426a through 426c, do not lie on the discrete operating points. The transmit power for each of these eigenmodes is reduced by a backed-off amount, $BO_k$, for k∈K, so that the eigenmode is operating at a lower transmit power without incurring a loss in spectral efficiency. The transmit power, $\hat{P}_k$, required to operate at the discrete operating point, d, for eigenmode k may be expressed as:

$$\hat{P}_k = \frac{\gamma_k(d) \cdot \sigma^2}{\lambda_k}, \quad \text{Eq (15)}$$

where the variable k, for $k \in K \subset I$, refers to each eigenmode in set K, and $\gamma_k(d)$ is the discrete operating point that corresponds to the current spectral efficiency, $\rho_k(d)$, on eigenmode k.

The excess transmit power obtained by decreasing the transmit power allocated to the eigenmodes in set K is then determined, at step 320, as follows:

$$\Delta \hat{P} = \sum_{k \in K} (P_k - \hat{P}_k), \quad \text{Eq (16)}$$

where $P_k$ refers to the initial transmit power allocated to eigenmode k in step 312. Because the excess power can only be reallocated among the eigenmodes operating below their respective saturation regions, those eigenmodes from the complete set of eigenmodes, I, whose new (or unchanged) effective SNRs are below their saturation points, $\gamma_{sat}(i)$, are denoted by the index j and placed into set J, at step 322. If set J is empty, as determined at step 324, then the process terminates. Set J thus contains all eigenmodes in set I that are operating below their respective saturation (not operating) point once the new powers have been applied to the eigenmodes in set K.

Otherwise, the excess transmit power, $\Delta \hat{P}$, determined in step 320 is reallocated among the eigenmodes in set J in various different combinations (e.g., in all possible combinations), at step 326. This can be performed based on knowledge of the spectral efficiency as a function of the effective SNR for each eigenmode (e.g., as shown by plot 422 in FIG. 4B). To facilitate the evaluation in step 326, a table of incremental SNRs, $\Delta\gamma_j(d)$, and the corresponding gains in spectral efficiency, $\Delta\rho_j(d)$, may be determined for each operating point d of each eigenmode j in set J.

The incremental SNR, $\Delta\gamma_j(d)$, is defined as:

$$\Delta\gamma_j(d) = \gamma_j(d+1) - \gamma_j(d), \quad \text{Eq (17)}$$

and is the minimum amount of SNR needed to move eigenmode j from the spectral efficiency at the current operating point, d, up to the operating point of the next higher spectral efficiency, d+1. The corresponding gain in spectral efficiency, $\Delta\rho_j(d)$, is given by:

$$\Delta\rho_j(d) = \rho_j(d+1) - \rho_j(d), \quad \text{Eq (18)}$$

and is obtained by increasing the SNR from $\gamma_j(d)$ to $\gamma_j(d+1)$.

FIG. 4B illustrates both the incremental SNR and the resulting gain in spectral efficiency for the given spectral efficiency function. The incremental SNR, $\Delta\gamma_j(d)$, can be translated to an incremental transmit power, $\Delta P_j(d)$, as follows:

$$\Delta P_j(d) = \frac{\Delta\gamma_j(d) \cdot \sigma^2}{\lambda_j}. \quad \text{Eq (19)}$$

$\Delta P_j(d)$ is the incremental power required to achieve the next higher spectral efficiency on eigenmode j from the current operating point, d.

The reallocation of the excess transmit power may be performed so that the highest possible gain in spectral efficiency is achieved. This may be achieved by performing an exhaustive search (or evaluation) of all possible reallocations of the excess transmit power, $\Delta \hat{P}$, to all eigenmodes in set J using the incremental transmit power and the corresponding gain in spectral efficiency obtained from equations (19) and (18), respectively, at step 328. Finally, the excess transmit power is distributed according to the reallocation that yields the highest gain in spectral efficiency, at step 330. The process then terminates.

Various other schemes may also be used to reallocate the excess transmit power to the eigenmodes in set J. In one scheme, the excess transmit power is reallocated to one eigenmode at a time starting with the best eigenmode. For example, some excess transmit power may be reallocated to the highest eigenmode in set J (e.g., just enough power to move this eigenmode to the next higher spectral efficiency level). Some remaining excess transmit power may then be reallocated to the next highest eigenmode in set J, and the process can continue in this manner until all excess transmit power has been reallocated. In another scheme, all power reallocations that would achieve a jump to the next higher spectral efficiency for each eigenmode in set J are initially determined, and the reallocation that achieves the highest spectral efficiency gain (or uses the least amount of incremental transmit power if the gains in spectral efficiency are the same over all the eigenmodes) is selected. Other schemes may also be used and are within the scope of the invention.

A specific numerical example is described below to illustrate the techniques for allocating/reallocating the total transmit power among eigenmodes for a system that supports a set of discrete data rates. For this example, the peak transmit power for each transmit antenna is normalized so that $P_{max} = 1$, and the variance of the noise is set so that the SNR at each receiver, assuming no other channel degradation, is $\gamma_{rx} = 10$ dB. This then results in a noise variance of $\sigma^2 = 10^{-10/10} = 0.10$. The following parameters are also assumed:

$N_S = N_T = N_R = 3$, and $\lambda_1 = 1.7$, $\lambda_2 = 0.9$, and $\lambda_3 = 0.4$.

Figure 4C:
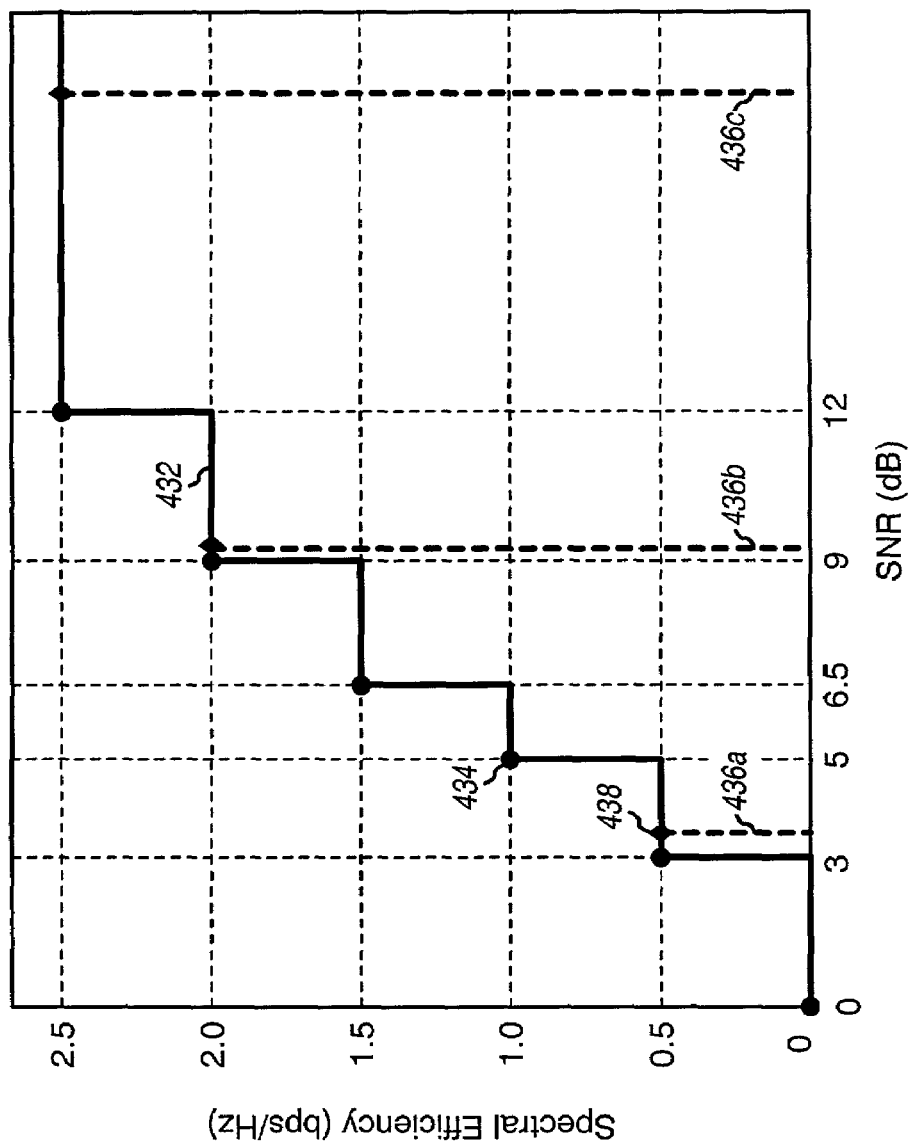

FIG. 4C shows the spectral efficiency versus effective SNR for the above example system. The same set of discrete data rates is assumed to apply for all eigenmodes and is associated with the spectral efficiency function shown by plot 432. The saturation SNR for each eigenmode is thus, $\gamma_{sat}(i)|_{dB} = 12$ dB, $\forall i \in I$.

The total transmit power available at the transmitter is $P_{tot} = 3 \cdot 1 = 3$. The water-filling power allocation (step 312) results in the following powers being assigned to the three eigenmodes:

$P_1(1) = 1.08$, $P_2(1) = 1.03$, and $P_3(1) = 0.89$.

The effective SNRs for the eigenmodes, calculated using equation (11), are determined to be:

$\gamma_1(1) = 18.38$, $\gamma_2(1) = 9.26$, and $\gamma_3(1) = 3.56$.

The locations of the effective SNRs of the three eigenmodes on the spectral efficiency function is shown by diamonds 438a through 438c in FIG. 4C. It can be seen that all three eigenmodes do not lie on the discrete operating points shown by solid circles 434. Thus, set K is determined to be K={1, 2, 3} (step 314). Since set K is not empty, the minimum transmit power for each eigenmode that still results in the current spectral efficiency value of that eigenmode is determined (step 318). For this example, the transmit powers of the eigenmodes are backed off so that the effective SNRs are 12 dB, 9 dB, and 3 dB for the first, second, and third eigenmode, respectively.

Using equation (15), the new transmit powers for the three eigenmodes are determined to be:

$$\hat{P}_1 = \frac{10^{(12/10)} \times 0.1}{1.7} = 0.93, \hat{P}_2 = \frac{10^{(9/10)} \times 0.1}{0.9} = 0.88, \text{ and } \hat{P}_3 = \frac{10^{(3/10)} \times 0.1}{0.4} = 0.50.$$

The new transmit power allocations push the operating points of the three eigenmodes to the discrete operating points. Next, the excess transmit power is determined by equation (16) to be $$\Delta\hat{P} = (1.08 - 0.93) + (1.03 - 0.88) + (0.89 - 0.50) = 0.69.$$

Since the first eigenmode is already at its saturation point, no more transmit power is reallocated to this eigenmode. The excess transmit power can be reallocated to eigenmodes two and three, and set J is equal to J={2, 3}.

Table 1 lists the incremental SNR, $\Delta\gamma_j(d)$, for each operating point, d, and each eigenmode, for $j \in J$. Because the discrete data rates are the same for all eigenmodes in this example, the subscript j is dropped and the incremental SNR is expressed as $\Delta\gamma(d)$. The incremental transmit power, $\Delta P_j(d)$, on eigenmode j is a function of the eigenvalue on eigenmode j, $\lambda_j$. The $\Delta P_j(d)$ s are shown for each eigenmode, for $j \in J$, and for each operating point, d, as calculated using equation (19). Finally, the last column lists the incremental gain in spectral efficiency, $\Delta\rho_j(d)$, which remains constant at 0.5 bps/Hz for all operating points, as shown in FIG. 4C.

TABLE 1

| d | $\Delta\gamma(d)(dB)$ | $\Delta P_2(d)$ | $\Delta P_3(d)$ | $\Delta\rho(d)$ |
|---|---|---|---|---|
| 1 | 3 | 0.22 | 0.50 | 0.5 |
| 2 | 2 | 0.18 | 0.40 | 0.5 |
| 3 | 1.5 | 0.16 | 0.35 | 0.5 |
| 4 | 2.5 | 0.20 | 0.44 | 0.5 |
| 5 | 3 | 0.22 | 0.5 | 0.5 |
| 6 | inf | inf | inf | 0 |

The next step is then to determine all possible reallocations of the excess transmit power, $\Delta\hat{P}=0.69$. Because the second and third eigenmodes are operating at d=5 and d=2, respectively, there is only one valid allocation of the excess power, which is to reallocate $\Delta P_2(d)=0.22$ more transmit power to the second eigenmode and $\Delta P_3(d)=0.40$ more transmit power to the third eigenmode. This power reallocation will result in an increase of 1 bps/Hz in spectral efficiency, and the amount of unused transmit power is $\Delta\hat{P}_u = 0.69 - 0.22 - 0.40 = 0.7$.

As noted above, the techniques described herein for allocating/reallocating transmit power to transmission channels may be used for various multi-channel communication systems, including MIMO systems, OFDM systems, MIMO-OFDM systems, and so on. These techniques may be advantageously used for systems having a saturation spectral efficiency, $\rho_{sat}$, (as illustrated in FIG. 4A) and for systems supporting one or more sets of discrete data rates for the transmission channels (as illustrated in FIG. 4B). The process shown in FIG. 3 may be modified to allocate/reallocate transmit power to transmission channels (instead of eigenmodes).

Power Allocation/Reallocation for a Specified Spectral Efficiency

The techniques described above may be used to allocate/reallocate the total transmit power to maximize spectral efficiency (e.g., to achieve the highest possible overall throughput or aggregate data rate for the transmission channels). For some communication systems, the aggregate data rate may be limited or specified. For these systems, the techniques described above may be modified and used to allocate the minimum amount of transmit power that achieves the specified aggregate data rate.

The allocation of the minimum transmit power that achieves a particular spectral efficiency may be performed in various manners, which may be dependent on the design and capabilities of the communication system. Several possible schemes are provided below.

For a system that supports a set of discrete data rates, the minimum transmit power allocation for a specified spectral efficiency may be achieved as follows.

1. Allocate the total transmit power to the transmission channels, e.g., based on the water-filling scheme.
2. Determine a new transmit power for each transmission channel using the techniques mentioned above such that its operating point falls on a discrete operating point that achieves the same spectral efficiency.
3. Determine the aggregate spectral efficiency achieved with the new transmit power allocation. If this spectral efficiency is higher than the specified spectral efficiency, then proceed to step 4. Otherwise, the transmit power allocation is finished.
4. Determine the "excess" spectral efficiency as the difference between the achievable spectral efficiency (with the new transmit power allocation) and the specified spectral efficiency. The spectral efficiency of the system is then lowered by this determined difference.
5. Form a table of incremental transmit power/incremental spectral efficiency for each transmission channel, an example of which is Table 1.
6. Search over various possible reductions in transmit power that will achieve a spectral efficiency reduction less than or equal to the excess spectral efficiency determined in step 4.
7. From step 6, select the transmit power reduction that maximizes the amount of transmit power saved.

For a system that supports more continuously variable data rates (e.g., discrete data rates of finer increments), an iterative search may be performed to determine the minimum transmit power allocation for a specified spectral efficiency. In particular, after the total transmit power has been initially allocated (e.g., based on the water-filling scheme), the excess spectral efficiency may be determined as described above. If the excess spectral efficiency exceeds a particular threshold (e.g., a particular percentage over the specified spectral efficiency), then a new transmit power allocation may be determined that reduces the excess spectral efficiency. This may be achieved by backing off the total transmit power (e.g., by some percentage that may be estimated based on the percentage of the excess spectral efficiency), and allocating the backed-off transmit power to the transmission channels (e.g., again based on the water-filling scheme). If the spectral efficiency achieved with the backed-off transmit power is less than the specified spectral efficiency, then the back-off may be reduced, and the new backed-off transmit power is again allocated to the transmission channels. This process can be iterated as many times as needed until the spectral efficiency achieved with a particular backed-off transmit power is within the acceptable threshold.

Other schemes for determining the minimum transmit power allocation for a specified spectral efficiency may also be implemented, and this is within the scope of the invention.

Water-Filling Power Allocation

When full CSI is available at the transmitter, the MIMO channel can be diagonalized into $N_S$ orthogonal channels using singular-value decomposition, as described above. This technique results in $N_S$ non-interfering spatial subchannels, referred to as eigenmodes, with the power on eigenmode i being equal to the eigenvalue associated with that eigenmode, $\lambda_i$, for $i \in I = \{1, 2, \ldots, N_S\}$. The performance on each spatial subchannel is limited by the additive white Gaussian noise (AWGN) of variance $\sigma^2$.

Figure 5:
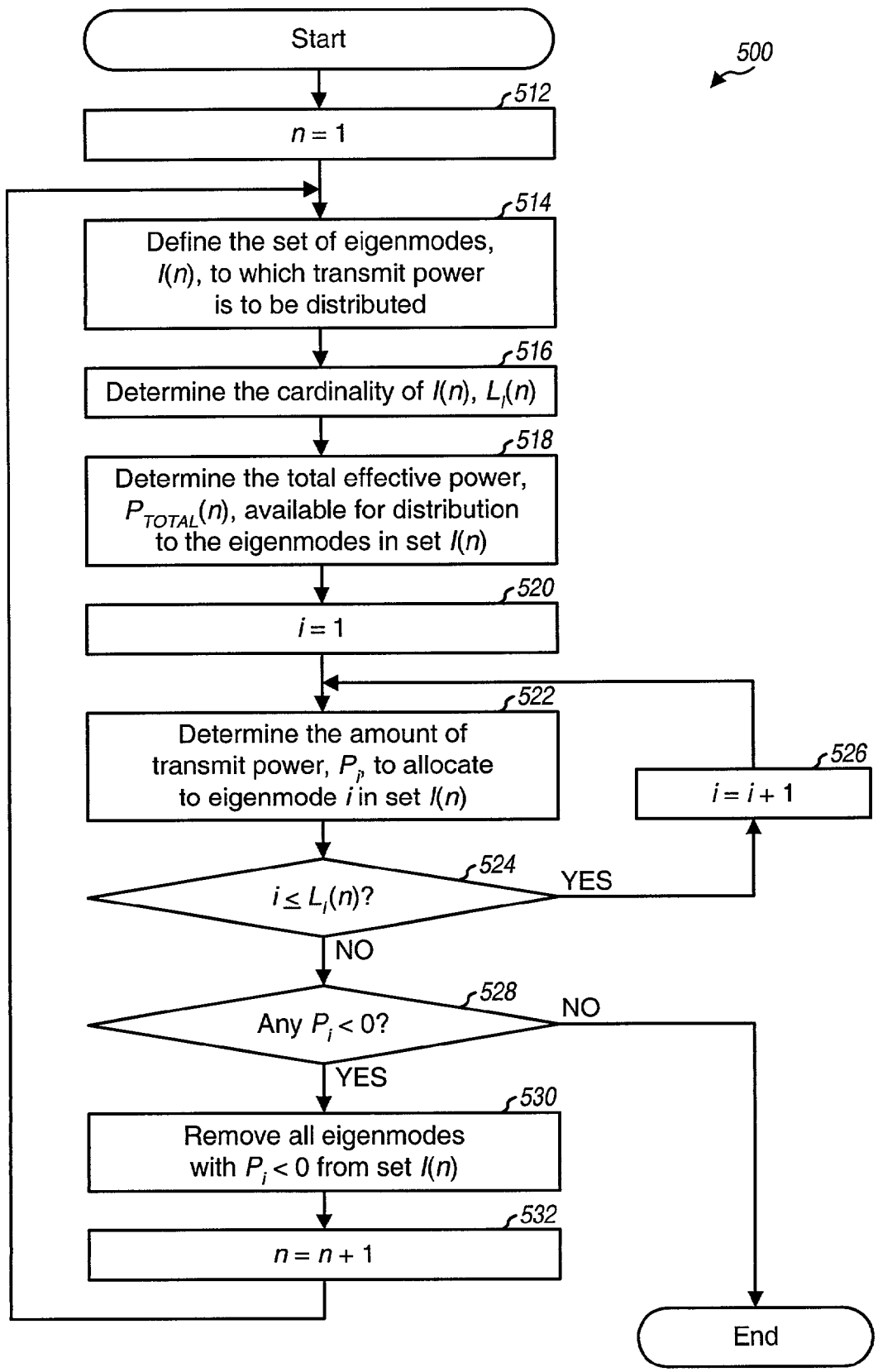
FIG. 5 is a flow diagram of an embodiment of a process for allocating the total available transmit power to a set of eigenmodes based on the water-filling scheme.

FIG. 5 is a flow diagram of an embodiment of a process 500 for allocating the total available transmit power to a set of eigenmodes. Process 500 is one specific implementation of the water-filling scheme, and may be used for steps 120, 220, and 312 in FIGS. 1, 2, and 3, respectively. The water-filling scheme determines the transmit power, $P_i$, for $i \in I$, to be allocated to the eigenmodes in set I given the total transmit power, $P_{tot}$, available at the transmitter, the eigenvalues, $\lambda_i$, and the noise variance, $\rho_2$.

Initially, the variable n used to denote the iteration number is set to one (i.e., n=1), at step 512. For the first iteration, set I(n) is defined to include all the eigenmodes (i.e., $1 \leq i \leq N_S$), at step 514. The cardinality (or length) of set I(n), $L_I(n)=|I(n)|$, for the current iteration is then determined, at step 516, which is $L_I(n)=N_S$ for the first iteration.

The total "effective" power, $P_{TOTAL}$, to be distributed across the eigenmodes in set I(n) is next determined, at step 518. The total effective power is defined to be equal to the total transmit power, $P_{tot}$, available at the transmitter plus the sum of the inverse SNRs on each eigenmode, as follows:

$$P_{TOTAL} = P_{tot} + \sum_{i \in I} \frac{\sigma^2}{\lambda_i}. \quad \text{Eq (20)}$$

Figure 6A:
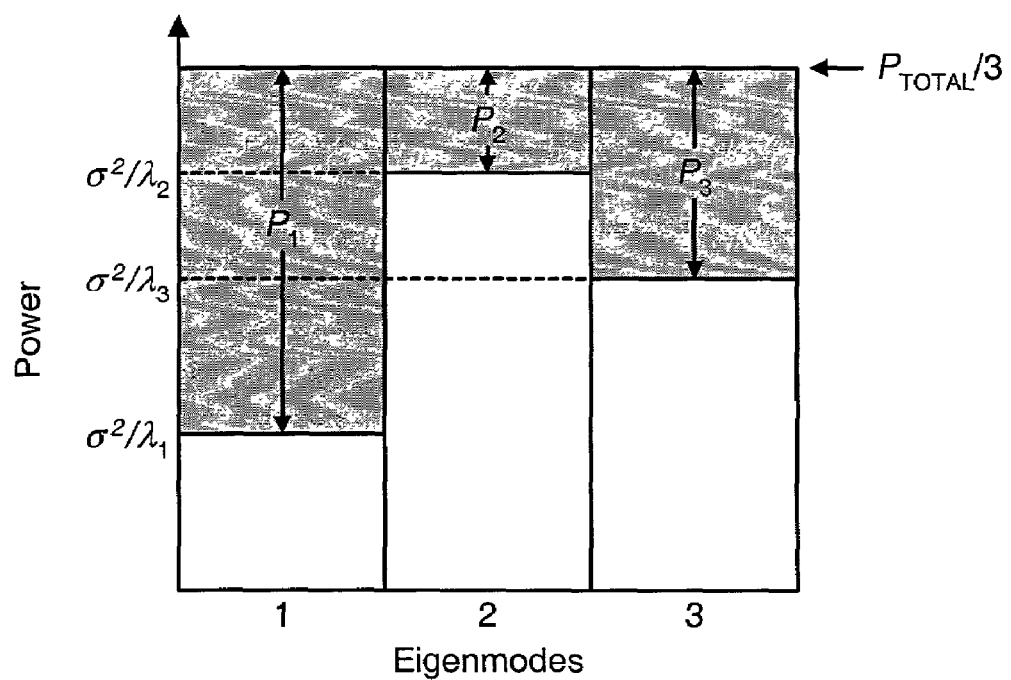
FIGS. 6A and 6B graphically illustrate the allocation of the total transmit power to the eigenmodes based on the water-filling scheme.

FIG. 6A graphically illustrates the total effective power for an example system with three eigenmodes. Each eigenmode has an inverse SNR equal to $\sigma^2/\lambda_i$ (assuming a normalized transmit power of 1.0) for i={1, 2, 3}. The total amount of transmit power available at the transmitter is $P_{tot}=P_1+P_2+P_3$, and is represented by the shaded area in FIG. 6A. The total effective power is represented by the area in the shaded and unshaded regions in FIG. 6A.

The total transmit power is then allocated to the eigenmode in set I(n). The index i used for the eigenmodes is initialized to one (i.e., i=1), at step 520. The amount of transmit power to be allocated to eigenmode i is then determined, at step 522, based on the following:

$$P_i = \frac{P_{TOTAL}}{L_I(n)} - \frac{\sigma^2}{\lambda_i}. \quad \text{Eq (21)}$$

For water-filling, although the bottom of the water level has an irregular surface, the water level at the top remains constant across the vessel. Likewise and as shown in FIG. 6A, after the total transmit power, $P_{tot}$, is distributed over the eigenmodes, the final power level is constant across all eigenmodes. This final power level is determined by dividing $P_{TOTAL}$ by the number of eigenmodes in set I(n), $L_I(n)$. The amount of power allocated to eigenmode i is then determined by subtracting the inverse SNR of that eigenmode, $\sigma^2/\lambda_i$, from the final power level, $P_{TOTAL}/L_I(n)$, as given by equation (21) and shown in FIG. 6A. Each eigenmode in set I(n) is allocated transmit power, $P_i$, by step 522. Steps 524 and 526 are part of a loop to allocate transmit power to each eigenmode in set I(n).

Figure 6B:
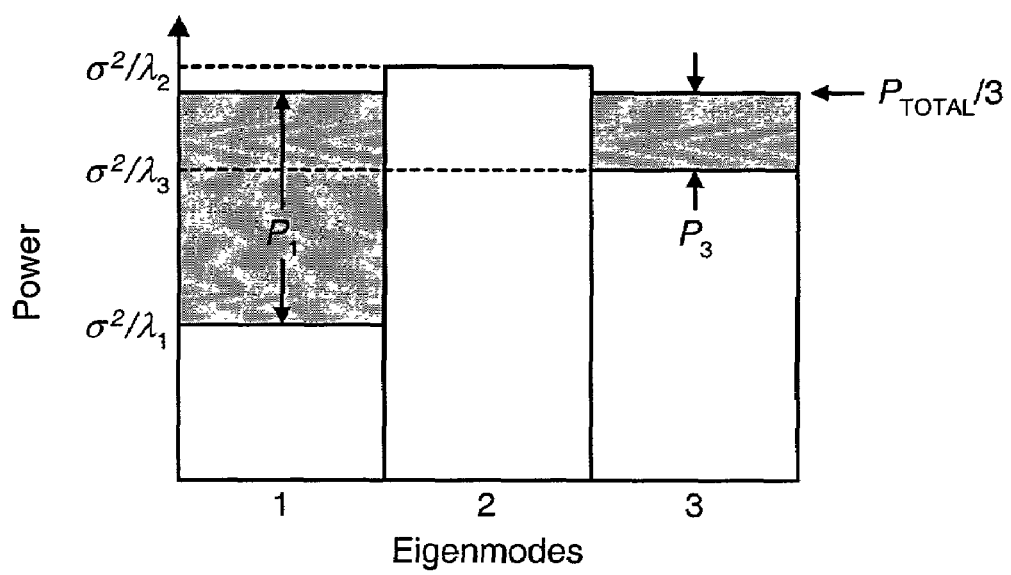

FIG. 6B shows a situation where the power allocation by the water-filling scheme results in an eigenmode receiving negative power, which is the case when $(P_{TOTAL}/L_I(n))<(\sigma^2/\lambda_i)$. At the end of the power allocation, if there are eigenmodes that have received negative powers, as determined at step 528, then the process continues by removing all eigenmodes with negative powers (i.e., $P_i<0$) from set I(n), at step 530, and incrementing n by one (i.e., n=n+1), at step 532. Therefore, on each subsequent iteration, the total transmit power is divided among the remaining eigenmodes in set I(n). The procedure continues until all eigenmodes in set I(n) have been allocated positive power, as determine in step 528. The eigenmodes not in set I(n) are allocated zero power.

For clarity, the water-filling scheme has been described specifically for eigenmodes. In general, the water-filling scheme may be performed for any type of transmission channels (e.g., spatial subchannels, frequency subchannels, or frequency subchannels of spatial subchannels, depending on the system being implemented). The process shown in FIG. 5 may thus be modified to allocate transmit power to transmission channels (instead of eigenmodes).

A specific algorithm for performing the basic water-filling process for a MIMO-OFDM system is described in U.S. patent application Ser. No. 09/978,337, entitled "Method and Apparatus for Determining Power Allocation in a MIMO Communication System," filed Oct. 15, 2001, assigned to the assignee of the present application and incorporated herein by reference.

System

Figure 7:
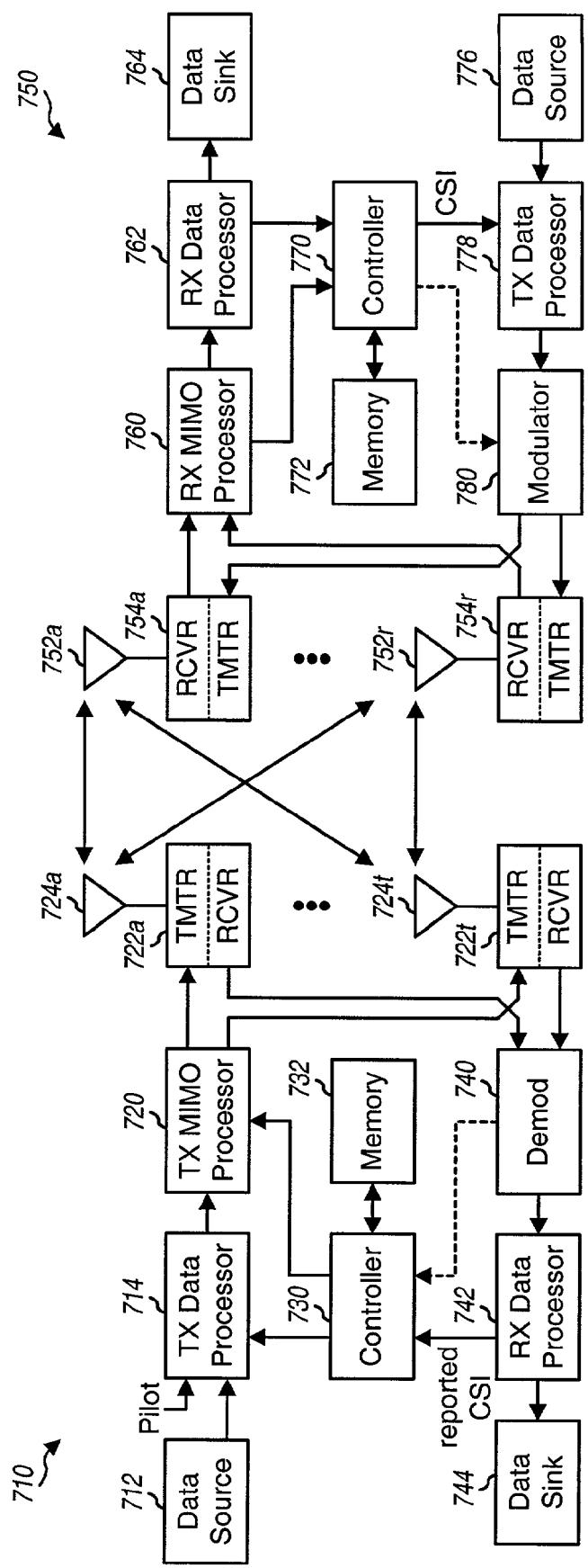
FIG. 7 is a block diagram of an embodiment of a transmitter system and a receiver system.

FIG. 7 is a block diagram of an embodiment of a transmitter system 710 and a receiver system 750, which are capable of implementing various aspects and embodiments of the invention.

At transmitter system 710, traffic data is provided from a data source 712 to a transmit (TX) data processor 714, which formats, codes, and interleaves the traffic data based on one or more coding schemes to provide coded data. The coded traffic data may then be multiplexed with pilot data using, e.g., time division multiplex (TDM) or code division multiplex (CDM) in all or a subset of the transmission channels to be used for data transmission. The pilot data is typically a known data pattern processed in a known manner, if at all. The multiplexed pilot and coded traffic data is then modulated (i.e., symbol mapped) based, on one or more modulation schemes (e.g., BPSK, QSPK, M-PSK, or M-QAM) to provide modulation symbols. The data rate, coding, interleaving, and modulation for each transmission channel or each group of transmission channels may be determined by various controls provided by a controller 730.

The modulation symbols are then provided to a TX MIMO processor 720 and further processed. In a specific embodiment, the processing by TX MIMO processor 720 includes (1) decomposing an estimate of the channel response matrix, H, to obtain the unitary matrix, V, and the diagonal matrix, D, (2) pre-multiplying the modulation symbols (i.e., the signal vector s) with the unitary matrix V, and (3) demultiplexing the pre-conditioned symbols (i.e., the transmit vector x) into $N_T$ symbol streams. In another embodiment, the processing by TX MIMO processor 720 simply includes demultiplexing the modulation symbols into $N_T$ symbol streams (i.e., no preconditioning of the symbols with the matrix V). TX MIMO processor 720 may further scale each symbol by an appropriate weight determined based on the amount of transmit power allocated to the transmission channel used for that symbol. The $N_T$ (weighted) symbol streams are then provided to transmitters (TMTR) 722a through 722t.

Each transmitter 722 receives and processes a respective symbol stream. For an OFDM system, each transmitter transforms the symbols (e.g., using the IFFT) to form OFDM symbols, and may further append a cyclic prefix to each OFDM symbol to form a corresponding transmission symbol. Each transmitter also converts the symbol stream into one or more analog signals and further conditions (e.g., amplifies, filters, and quadrature modulates) the analog signals to generate a modulated signal suitable for transmission over the MIMO channel. $N_T$ modulated signals from transmitters 722a through 722t are then transmitted from $N_T$ antennas 724a through 724t, respectively.

At receiver system 750, the transmitted modulated signals are received by NR antennas 752a through 752r, and the received signal from each antenna 752 is provided to a respective receiver (RCVR) 754. Each receiver 754 conditions (e.g., filters, amplifies, and downconverts) the received signal and digitizes the conditioned signal to provide a respective stream of samples. Each sample stream may further be processed (e.g., demodulated with the recovered pilot) to obtain a corresponding stream of received symbols (denoted as y). A RX MIMO processor 760 then receives and processes the $N_R$ received symbol streams, to provide $N_T$ recovered symbol streams. In a specific embodiment, the processing by RX MIMO processor 760 may include (1) decomposing the estimated channel response matrix to obtain the unitary matrix, U, (2) pre-multiplying the received symbols (i.e., the vector y) with the unitary matrix, UH, to provide the recovered symbols (i.e., the vector r), and (3) equalizing the recovered symbols to obtain equalized symbols.

A receive (RX) data processor 762 then demodulates, deinterleaves, and decodes the equalized symbols to recover the transmitted traffic data. The processing by RX MIMO processor 760 and RX data processor 762 is complementary to that performed by TX MIMO processor 720 and TX data processor 714, respectively, at transmitter system 710.

RX MIMO processor 760 may further derive an estimate of the channel response matrix, H, for the MIMO channel, the SNRs for the transmission channels, and so on, and provide these quantities to a controller 770. RX data processor 762 may also provide the status of each received frame or packet, one or more other performance metrics indicative of the decoded results, and possibly other information. Controller 770 collects channel state information (CSI), which may comprise all or some of the information received from RX MIMO processor 760 and RX data processor 762. The CSI is then processed by a TX data processor 778, modulated by a modulator 780, conditioned by transmitters 754a through 754r, and transmitted back to transmitter system 710.

At transmitter system 710, the modulated signals from receiver system 750 are received by antennas 724, conditioned by receivers 722, demodulated by a demodulator 740, and processed by a RX data processor 742 to recover the CSI reported by the receiver system. The CSI is then provided to controller 730 and used to generate various controls for TX data processor 714 and TX MIMO processor 720.

Controllers 730 and 770 direct the operation at the transmitter and receiver systems, respectively. Memories 732 and 772 provide storage for program codes and data used by controllers 730 and 770, respectively.

To implement the transmit power allocation/reallocation techniques described above, controller 730 receives the CSI from receiver system 750, which may include the channel response matrix or some other information descriptive of the characteristics of the MIMO channel. Controller 730 then allocates the total transmit power to the transmission channels such that excess transmit power of transmission channels operated in the saturation region are reallocated to other transmission channels not in the saturation region, as described above. The transmit power, $P_i$, allocated to each transmission channel may then determine the data rate and the coding and modulation scheme to be used for that transmission channel.

Various MIMO and OFDM processing techniques for both the transmitter and receiver systems are described in detail in the following patent applications, all of which are assigned to the assignee of the present application and incorporated herein by reference:

U.S. patent application Ser. No. 09/993,087, entitled "Multiple-Access Multiple-Input Multiple-Output (MIMO) Communication System," filed Nov. 6, 2001;

U.S. patent application Ser. No. 09/854,235, entitled "Method and Apparatus for Processing Data in a Multiple-Input Multiple-Output (MIMO) Communication System Utilizing Channel State Information," filed May 11, 2001;

U.S. patent application Ser. Nos. 09/826,481 and 09/956,449, both entitled "Method and Apparatus for Utilizing Channel State Information in a Wireless Communication System," respectively filed Mar. 23, 2001 and Sep. 18, 2001; and U.S. patent application Ser. No. 10/017,308, entitled "Time-Domain Transmit and Receive Processing with Channel Eigenmode Decomposition for MIMO Systems," filed Dec. 7, 2001.

The transmit power allocation/reallocation techniques described herein may be implemented by various means. For example, these techniques may be implemented in hardware, software, or a combination thereof. For a hardware implementation, the elements used to allocate/reallocate transmit power to transmission channels may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the transmit power allocation/reallocation may be implemented with modules (e.g., procedures, functions, and so on) that perform the functions described herein. The software codes may be stored in a memory unit (e.g., memory 732 in FIG. 7) and executed by a processor (e.g., controller 730). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for allocating transmit power to a plurality of transmission channels in a wireless communication system, comprising:
    defining a set of one or more transmission channels to be allocated transmit power;
    determining a total transmit power available to allocate to the transmission channels in the set;
    allocating the total transmit power to the transmission channels in the set based on a particular allocation scheme;
    identifying transmission channels in a saturation region resulting from the allocated transmit power;
    reallocating each transmission channel in the saturation region with a revised amount of transmit power;
    determining a total excess transmit power for all transmission channels reallocated with revised amounts of transmit power; and
    performing the defining, determining, allocating, identifying, and reallocating for one or more iterations, wherein the set of transmission channels for a first iteration includes the plurality of transmission channels and for each subsequent iteration includes transmission channels not in the saturation region, and wherein the total transmit power available for each subsequent iteration includes the total excess transmit power determined in a current iteration.

2. The method of claim 1, wherein the total transmit power available for each iteration is allocated to the transmission channels in the set based on a water-filling allocation scheme.

3. The method of claim 1, wherein a transmission channel is deemed as being in the saturation region if it is allocated more transmit power than needed to achieve a particular maximum data rate.

4. The method of claim 3, wherein the revised amount of transmit power allocated to each transmission channel in the saturation region is a minimum amount needed to achieve the maximum data rate.

5. The method of claim 1, wherein a transmission channel is deemed as being in the saturation region if it is allocated more transmit power than needed to achieve a particular signal-to-noise ratio (SNR).

6. The method of claim 5, wherein a single SNR is used for all transmission channels in the set.

7. The method of claim 5, wherein each transmission channel is associated with a respective threshold SNR.

8. The method of claim 1, wherein the identifying includes
    determining an effective signal-to-noise ratio (SNR) for each transmission channel in the set based in part on the transmit power allocated to the transmission channel,
    comparing the effective SNR for each transmission channel in the set to a threshold SNR applicable to the transmission channel, and
    declaring a transmission channel as being in the saturation region if its effective SNR is greater than the applicable threshold SNR.

9. The method of claim 8, wherein the threshold SNR corresponds to an SNR needed to achieve a particular maximum data rate.

10. The method of claim 1, wherein the wireless communication system is a multiple-input multiple-output (MIMO) communication system.

11. The method of claim 10, wherein the plurality of transmission channels correspond to a plurality of eigenmodes for a MIMO channel of the MIMO communication system.

12. The method of claim 1, wherein the wireless communication system is an orthogonal frequency division multiplexing (OFDM) communication system.

13. The method of claim 1, wherein the wireless communication system is a multiple-input multiple-output (MIMO) communication system that utilizes orthogonal frequency division multiplexing (OFDM).

14. A method for allocating transmit power to a plurality of spatial subchannels in a multiple-input multiple-output (MIMO) communication system, comprising:
    defining a set of one or more spatial subchannels to be allocated transmit power;
    determining a total transmit power available to allocate to the spatial subchannels in the set;
    allocating the total transmit power to the spatial subchannels in the set based on a particular allocation scheme;
    identifying spatial subchannels in a saturation region resulting from the allocated transmit power;
    reallocating each spatial subchannel in the saturation region with a revised amount of transmit power;
    determining a total excess transmit power for all spatial subchannels reallocated with revised amounts of transmit power; and
    performing the defining, determining, allocating, identifying, and reallocating for one or more iterations, wherein the set of spatial subchannels for a first iteration includes the plurality of spatial subchannels and for each subsequent iteration includes spatial subchannels not in the saturation region, and wherein the total transmit power available for each subsequent iteration includes the total excess transmit power determined in a current iteration.

15. The method of claim 14, wherein the total transmit power available for each iteration is allocated to the spatial subchannels in the set based on a water-filling allocation scheme.

16. A method for allocating transmit power to a plurality of transmission channels in a wireless communication system, comprising:
    identifying a first set of transmission channels to be allocated transmit power;
    determining a total transmit power available to allocate to the transmission channels in the first set;
    allocating the total transmit power to the transmission channels in the first set based on a particular allocation scheme;
    identifying a second set of one or more transmission channels allocated excessive transmit power for preferred operating points;

allocating each transmission channel in the second set with a revised amount of transmit power to achieve the preferred operating point;

determining a total excess power for all transmission channels in the second set;

identifying a third set of one or more transmission channels capable of supporting higher preferred operating points; and reallocating the total excess power to the one or more transmission channels in the third set.

17. The method of 16, wherein each preferred operating point is associated with a signal-to-noise ratio (SNR) needed to support a particular discrete data rate.

18. The method of 16, further comprising:
evaluating a plurality of possible reallocations of the total excess power to the one or more transmission channels in the third set.

19. The method of 18, further comprising:
selecting a reallocation associated with a highest gain in throughput.

20. The method of 16, wherein the total excess power is reallocated, one channel at a time, to the one or more transmission channels in the third set.

21. The method of 16, wherein each transmission channel is reallocated sufficient transmit power to achieve a next higher preferred operating point.

22. The method of 16, wherein the reallocating includes
determining an amount of transmit power needed for each transmission channel in the third set to achieve a next higher preferred operating point, and
reallocating the total excess power to the transmission channel associated with a highest gain in throughput.

23. The method of 16, wherein the total transmit power is allocated to the transmission channels in the first set based on a water-filling scheme.

24. The method of 16, wherein the plurality of transmission channels correspond to spatial subchannels in a MIMO system.

25. The method of 16, wherein the plurality of transmission channels correspond to frequency subchannels in an OFDM system.

26. The method of 16, wherein the plurality of transmission channels correspond to frequency subchannels of spatial subchannels in a MIMO-OFDM system.

27. A memory communicatively coupled to a digital signal processing device (DSPD) capable of interpreting digital information to:
define a set of one or more transmission channels to be allocated transmit power;
determine a total transmit power available to allocate to the transmission channels in the set;
allocate the total transmit power to the transmission channels in the set based on a particular allocation scheme;
identify transmission channels in a saturation region resulting from the allocated transmit power;
reallocate each transmission channel in the saturation region with a revised amount of transmit power;
determine a total excess transmit power for all transmission channels reallocated with revised amounts of transmit power; and
perform the define, determine, allocate, identify, and reallocate for one or more iterations, wherein the set of transmission channels for a first iteration includes a plurality of transmission channels in a wireless communication system and for each subsequent iteration includes transmission channels not in the saturation region, and wherein the total transmit power available for each subsequent iteration includes the total excess transmit power determined in a current iteration.

28. A computer program product for allocating transmit power to a plurality of transmission channels in a wireless communication system, comprising:
code for defining a set of one or more transmission channels to be allocated transmit power;
code for determining a total transmit power available to allocate to the transmission channels in the set;
code for allocating the total transmit power to the transmission channels in the set based on a particular allocation scheme;
code for identifying transmission channels in a saturation region resulting from the allocated transmit power;
code for reallocating each transmission channel in the saturation region with a revised amount of transmit power;
code for determining a total excess transmit power for all transmission channels reallocated with revised amounts of transmit power;
code for performing the defining, determining, allocating, identifying, and reallocating for one or more iterations, wherein the set of transmission channels for a first iteration includes the plurality of transmission channels and for each subsequent iteration includes transmission channels not in the saturation region, and wherein the total transmit power available for each subsequent iteration includes the total excess transmit power determined in a current iteration; and
a computer-usable medium for storing the codes.

29. An apparatus in a wireless communication system, comprising:
means for defining a set of one or more transmission channels to be allocated transmit power;
means for determining a total transmit power available to allocate to the transmission channels in the set;
means for allocating the total transmit power to the transmission channels in the set based on a particular allocation scheme;
means for identifying transmission channels in a saturation region resulting from the allocated transmit power;
means for reallocating each transmission channel in the saturation region with a revised amount of transmit power;
means for determining a total excess transmit power for all transmission channels reallocated with revised amounts of transmit power; and
means for performing the defining, determining, allocating, identifying, and reallocating for one or more iterations, wherein the set of transmission channels for a first iteration includes the plurality of transmission channels and for each subsequent iteration includes transmission channels not in the saturation region, and wherein the total transmit power available for each subsequent iteration includes the total excess transmit power determined in a current iteration.

30. A controller in a wireless communication system, comprising:
means for defining a set of one or more transmission channels to be allocated transmit power;
means for determining a total transmit power available to allocate to the transmission channels in the set;
means for allocating the total transmit power to the transmission channels in the set based on a particular allocation scheme;

means for identifying transmission channels in a saturation region resulting from the allocated transmit power;

means for reallocating each transmission channel in the saturation region with a revised amount of transmit power;

means for determining a total excess transmit power for all transmission channels reallocated with revised amounts of transmit power; and means for performing the defining, determining, allocating, identifying, and reallocating for one or more iterations, wherein the set of transmission channels for a first iteration includes the plurality of transmission channels and for each subsequent iteration includes transmission channels not in the saturation region, and wherein the total transmit power available for each subsequent iteration includes the total excess transmit power determined in a current iteration.

31. The controller of claim 30, further comprising:

means for determining an effective signal-to-noise ratio (SNR) for each transmission channel in the set based in part on the transmit power allocated to the transmission channel;

means for comparing the effective SNR for each transmission channel in the set to a threshold SNR applicable to the transmission channel; and means for declaring a transmission channel as being in the saturation region if its effective SNR is greater than the applicable threshold SNR.

32. A base station comprising the controller of claim 30.

33. A controller in a wireless communication system, comprising:

means for identifying a first set of transmission channels to be allocated transmit power;

means for determining a total transmit power available to allocate to the transmission channels in the first set;

means for allocating the total transmit power to the transmission channels in the first set based on a particular allocation scheme;

means for identifying a second set of one or more transmission channels allocated excessive transmit power for preferred operating points;

means for allocating each transmission channel in the second set with a revised amount of transmit power to achieve the preferred operating point;

means for determining a total excess power for all transmission channels in the second set;

means for identifying a third set of one or more transmission channels capable of supporting higher preferred operating points; and means for reallocating the total excess power to the one or more transmission channels in the third set.

34. A transmitter unit in a wireless communication system, comprising:

a transmit (TX) data processor operative to code data for a plurality of transmission channels based on one or more coding and modulation schemes to provide a plurality of streams of symbols;

a plurality of transmitters operative to process the plurality of symbol streams to provide a plurality of modulated signals suitable for transmission over a communication channel; and a controller operative to allocate transmit power to the plurality of transmission channels by defining a set of one or more transmission channels to be allocated transmit power, determining a total transmit power available to allocate to the transmission channels in the set, allocating the total transmit power to the transmission channels in the set based on a particular allocation scheme, identifying transmission channels in a saturation region resulting from the allocated transmit power, reallocating each transmission channel in the saturation region with a revised amount of transmit power, determining a total excess transmit power for all transmission channels reallocated with revised amounts of transmit power, and performing the defining, determining, allocating, identifying, and reallocating for one or more iterations, wherein the set of transmission channels for a first iteration includes the plurality of transmission channels and for each subsequent iteration includes transmission channels not in the saturation region, and wherein the total transmit power available for each subsequent iteration includes the total excess transmit power determined in a current iteration.

35. The transmitter unit of claim 34, wherein the TX data processor is further operative to scale each modulation symbol with a particular weight determined based on the transmit power allocated to the transmission channel used for the modulation symbol.

36. The transmitter unit of claim 34, further comprising:

a MIMO processor operative to pre-condition the plurality of symbol streams to diagonalize the plurality of transmission channels.

37. A base station comprising the transmitter unit of claim 34.

38. A receiver unit in a wireless communication system, comprising:

a receive (RX) MIMO processor operative to receive and process a plurality of streams of samples to provide a plurality of steams of received symbols, and to derive channel state information (CSI) for a plurality of transmission channels used for the plurality of received symbol streams; and a RX data processor operative to process the plurality of received symbol streams in accordance with one or more demodulation and decoding schemes to provide decoded data, and wherein transmit power for the plurality of transmission channels is allocated based in part on the CSI by allocating a total available transmit power to the plurality of transmission channels based on a particular allocation scheme, reallocating each transmission channel in a saturation region with a revised amount of transmit power, determining a total excess transmit power for all transmission channels reallocated wit revised amounts of transmit power; and performing the defining, determining, allocating, identifying, and reallocating for one or mare iterations, wherein the set of transmission channels for a first iteration includes the plurality of transmission channels and for each subsequent iteration includes transmission channels not in the saturation region, and wherein the total transmit power available for each subsequent iteration includes the total excess transmit power determined in a current iteration.

39. The receiver unit of claim 38, wherein the RX MIMO processor is further operative to pre-condition the plurality of received symbol streams to diagonalize the plurality of transmission channels.

40. The receiver unit of claim 38, further comprising:

a TX data processor operative to process the CSI for transmission back to a transmitter unit.

41. A receiver apparatus in a wireless communication system, comprising:
- means for processing a plurality of streams of samples to provide a plurality of streams of received symbols, and to derive channel state information (CSI) for a plurality of transmission channels used for the plurality of received symbol streams; and
- means for processing the plurality of received symbol streams in accordance with one or more demodulation and decoding schemes to provide decoded data, and
- wherein transmit power for the plurality of transmission channels is allocated based in part on the CSI by allocating a total available transmit power to the plurality of transmission channels based on a particular allocation scheme, reallocating each transmission channel in a saturation region with a revised amount of transmit power, determining a total excess transmit power for all transmission channels reallocated with revised amounts of transmit power; and performing the defining, determining, allocating, identifying, and reallocating for one or more iterations, wherein the set of transmission channels for a first iteration includes the plurality of transmission channels and for each subsequent iteration includes transmission channels not in the saturation region, and wherein the total transmit power available for each subsequent iteration includes the total excess transmit power determined in a current iteration.

* * * * *